United States Patent
Kim et al.

(10) Patent No.: US 12,546,494 B2
(45) Date of Patent: Feb. 10, 2026

(54) PORTABLE AIR PURIFIER

(71) Applicant: LG ELECTRONICS INC., Seoul (KR)

(72) Inventors: Juhyun Kim, Seoul (KR); Si Young Oh, Seoul (KR); Kidong Kim, Seoul (KR); Seok-Ho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 974 days.

(21) Appl. No.: 17/384,980

(22) Filed: Jul. 26, 2021

(65) Prior Publication Data

US 2022/0026085 A1    Jan. 27, 2022

(30) Foreign Application Priority Data

Jul. 27, 2020 (KR) .................. 10-2020-0093401
Dec. 11, 2020 (KR) .................. 10-2020-0173594

(51) Int. Cl.
| | |
|---|---|
| *B01D 46/00* | (2022.01) |
| *A61L 9/20* | (2006.01) |
| *B01D 46/10* | (2006.01) |
| *F24F 8/108* | (2021.01) |
| *F24F 8/20* | (2021.01) |
| *F24F 8/22* | (2021.01) |
| *F24F 8/80* | (2021.01) |

(52) U.S. Cl.
CPC .............. *F24F 8/108* (2021.01); *A61L 9/20* (2013.01); *B01D 46/0005* (2013.01); *F24F 8/80* (2021.01); *A61L 2209/14* (2013.01); *B01D 2273/30* (2013.01)

(58) Field of Classification Search
CPC ...... F24F 11/89; F24F 8/80; F24F 8/22; F24F 2013/205; F24F 2221/12; A61L 9/20
USPC ............... 55/358, 471–473; 422/121; 96/222
See application file for complete search history.

(56) References Cited

U.S. PATENT DOCUMENTS

D482,767 S  *  11/2003  Dudley ...................... D23/365
10,323,855 B2 *   6/2019  Jung ........................ F24F 8/10
(Continued)

FOREIGN PATENT DOCUMENTS

CN      204611988 U  *  9/2015  ............. F24F 13/28
CN      105509181        4/2016
(Continued)

OTHER PUBLICATIONS

Translation of KR-20130014729-A (Year: 2025).*
(Continued)

*Primary Examiner* — Duane Smith
(74) *Attorney, Agent, or Firm* — KED & ASSOCIATES, LLP

(57) ABSTRACT

A portable air purifier may include a housing having an accommodation space formed therein and including an inlet through which air is suctioned and an outlet through which air is discharged, a filter installed at an inside of the housing that faces the inlet, a fan module installed at the inside of the housing that faces the outlet, a filter case in which the filter is detachably installed and which is disposed between the filter and the fan module and configured to guide movement of air from the filter to the fan module, and a sanitizing portion mounted on the filter case and configured to irradiate sanitizing light toward the filter.

31 Claims, 29 Drawing Sheets

(56) References Cited

U.S. PATENT DOCUMENTS

| | | | |
|---|---|---|---|
| 10,326,855 B2* | 6/2019 | Chakra | H04L 67/02 |
| 10,563,667 B2* | 2/2020 | Park | F01P 7/167 |
| 10,697,665 B2* | 6/2020 | Jung | B01D 46/24 |
| 11,262,091 B2* | 3/2022 | Kim | F24F 11/52 |
| 2010/0089243 A1* | 4/2010 | Bailey | B01D 46/0038 |
| | | | 55/471 |
| 2013/0192467 A1* | 8/2013 | Lyras | B01D 46/02 |
| | | | 55/385.2 |

FOREIGN PATENT DOCUMENTS

| | | |
|---|---|---|
| CN | 109812891 | 5/2019 |
| CN | 111094027 | 5/2020 |
| CN | 111174349 | 5/2020 |
| EP | 3 163 178 | 5/2017 |
| JP | 2002-143282 | 5/2002 |
| KR | 20130014729 A * | 2/2013 ............ A61L 2/24 |
| KR | 10-2019-0029478 | 3/2019 |
| KR | 10-2020-0037187 | 4/2020 |
| KR | 20200075412 A * | 6/2020 ............ F24F 3/16 |
| KR | 10-2132859 | 7/2020 |
| KR | 10-2021-0099381 | 8/2021 |
| TW | 201111718 | 4/2011 |
| WO | WO 2005/028227 A1 * | 3/2005 ............ B60H 3/06 |

OTHER PUBLICATIONS

European Search Report issued in Application No. 21187765.9 dated Jan. 4, 2022.
Japanese Office Action dated Mar. 18, 2025.
Chinese Office Action issued in Application No. 202110817718.X dated Apr. 11, 2025.
Taiwanese Office Action dated Jun. 11, 2025 with English Translation.

* cited by examiner

PORTABLE AIR PURIFIER

CROSS-REFERENCE TO RELATED APPLICATION(S)

This application claims priority to and the benefit of Korean Patent Application No. 10-2020-0093401 filed in Korea on Jul. 27, 2020, Korean Patent Application No. 10-2020-0173594 filed in Korea on Dec. 11, 2020, the disclosures of which are incorporated herein by reference in their entirety.

BACKGROUND

1. Field

A portable air purifier is disclosed herein.

2. Background

An air purifier is an apparatus widely used in modern life that purifies air by filtering physical particles, such as dust, fine dust, and ultrafine dust, chemical substances, such as odor particles and harmful gases, and microorganisms, such as bacteria and viruses. Due to the influence of urbanization, industrialization, and globalization, the air purifier has become an indispensable apparatus in general homes. Also, the demand for the air purifier has also sharply increased due to an increase in fine dust levels, an increase in the number of allergy patients, and improvement in the standard of living, for example.

The air purifier may have a large size when targeting an environment larger than 100 m$^2$, such as a general home. In the apparatus, a filter that filters physical particles, such as dust, a filter that filters chemical substances, such as gases, and a filter that filters microorganisms, such as bacteria and viruses may be used in combination. That is, in a large space, an air purifier of a large size that accommodates various filters together may be used.

However, using an air purifier of a large size in a small space, such as a studio apartment or the inside of a vehicle, intended for an extremely large space, such as a public library, or outdoors, is inefficient in terms of space utilization, mobility, and energy consumption. Also, for users who often move from place to place, an air purifier which has a small size and can be easily carried for use by an individual is more suitable than an air purifier having a large size. Under such a background, a portable air purifier which may be easily carried for use by an individual is being developed.

The portable air purifier is provided in a small, lightweight form so that it is easy to carry. The portable air purifier has an advantage in that it may easily be carried and used at a desired location by a user. That is, the portable air purifier is an apparatus suitable for users who tend to frequently go out or move from place to place rather than staying in one place, such as their home, for a long period of time.

A related art document, Korean Patent Publication No. 10-2019-0029478 A, entitled "Portable Air Purifier" and which is hereby incorporated by reference, relates to an air purifier in which a rear panel through which air is suctioned and a front panel through which air is discharged are installed in a horizontal direction. Therefore, outside air that passes through the rear panel and enters a case sequentially passes through a filter and a fan assembly and then is discharged to the outside of the portable air purifier through a discharge port.

However, the related art does not include a separate sanitizing apparatus for sanitizing the filter, and thus, there is a problem in that the filter is prone to contamination. Also, when a separate sanitizing apparatus for sanitizing the filter is installed inside of the portable air purifier of the related art, a separate fixing bracket to fix the sanitizing apparatus should be additionally installed inside of the case. As the separate fixing bracket is additionally installed inside of the case, sizes of the filter and the fan assembly become relatively small, and thus, there is a problem in that an air purifying ability is degraded.

Also, when the additionally installed sanitizing apparatus is fixed to a fan module in the portable air purifier of the related art, sanitizing light irradiated from the sanitizing apparatus interferes with a filter case that fixes the filter, and thus, there is a problem in that sanitization of the filter is not performed properly. Also, when the sanitizing apparatus is installed at the fan module, there is a problem in that frictional resistance between the sanitizing apparatus and air suctioned through an inlet of the fan module increases, and thus, an air blowing ability is degraded.

In addition, the case of the portable air purifier of the related art is formed in a rectangular parallelepiped shape extending in a vertical direction, and corners of the case are provided at an outer side of the case. Therefore, an inconvenience may occur when a user holds the outer side of the case, and when mounting the portable air purifier on a structure, such as a cup holder having the shape of a groove which is concave toward the lower side, there is a problem in that a gap is formed between the case and the cylindrical groove-shaped cup holder and the gap causes the case to shake, which causes vibration and noise.

BRIEF DESCRIPTION OF THE DRAWINGS

Embodiments will be described in detail with reference to the following drawings in which like reference numerals refer to like elements, and wherein.

DETAILED DESCRIPTION

Figure 1:
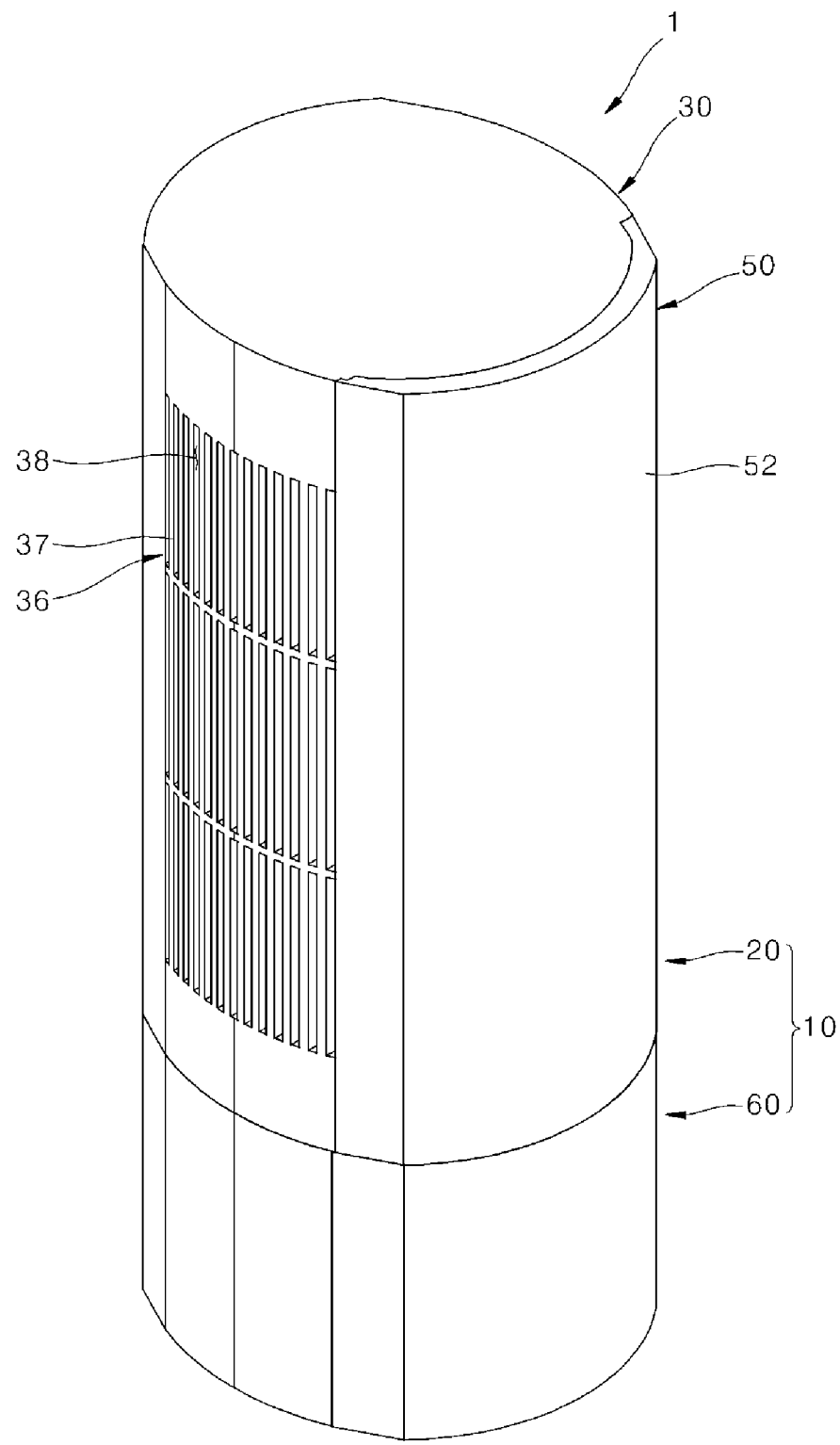
FIG. 1 is a perspective view of a portable air purifier according to an embodiment.

Embodiments are described below with reference to the accompanying drawings, and accordingly, those of ordinary skill in the art to which the embodiments pertain should be able to easily practice the technical idea. In describing the embodiments, when it is determined that detailed description of a known art relating to the embodiments may unnecessarily obscure the gist, detailed description thereof has been omitted. Hereinafter, embodiments will be described with reference to the accompanying drawings. In the drawings, the same reference numerals are used to indicate the same or similar elements.

Although terms such as first and second are used to describe various elements, of course, the elements are not limited by the terms. The terms are only used to distinguish one element from another element, and of course, a first element may also be a second element unless otherwise stated.

Hereinafter, when an arbitrary configuration is described as being disposed on an "upper portion (or lower portion)" of an element or being disposed "above (or below)" the element, this may not only mean that the arbitrary configuration is disposed in contact with an upper surface (or lower surface) of the element but may also mean that another configuration may be interposed between the element and the arbitrary configuration disposed above (or below) the element.

Also, when a certain element is described as being "connected," "coupled," or "linked" to another element, this may mean that the element is directly connected or linked to the other element but may also mean that the element is "connected," "coupled," or "linked" to the other element via another element "interposed" therebetween or the element and the other element are "connected," "coupled," or "linked" through different elements.

Throughout the specification, each element may be provided as a single element or a plurality of elements unless particularly described otherwise.

In the specification, a singular expression includes a plural expression unless the context clearly indicates otherwise. In the application, terms such as "comprise" or "include" should not necessarily be interpreted as indicating that all of various elements or various steps described in the specification are included and should be interpreted as indicating that some of the elements or some of the steps may not be included or additional elements or steps may be further included.

Throughout the specification, "A and/or B" may refer to A, B, or A and B unless particularly described otherwise, and "C to D" may refer to C or more and D or less unless particularly described otherwise.

Figure 2:
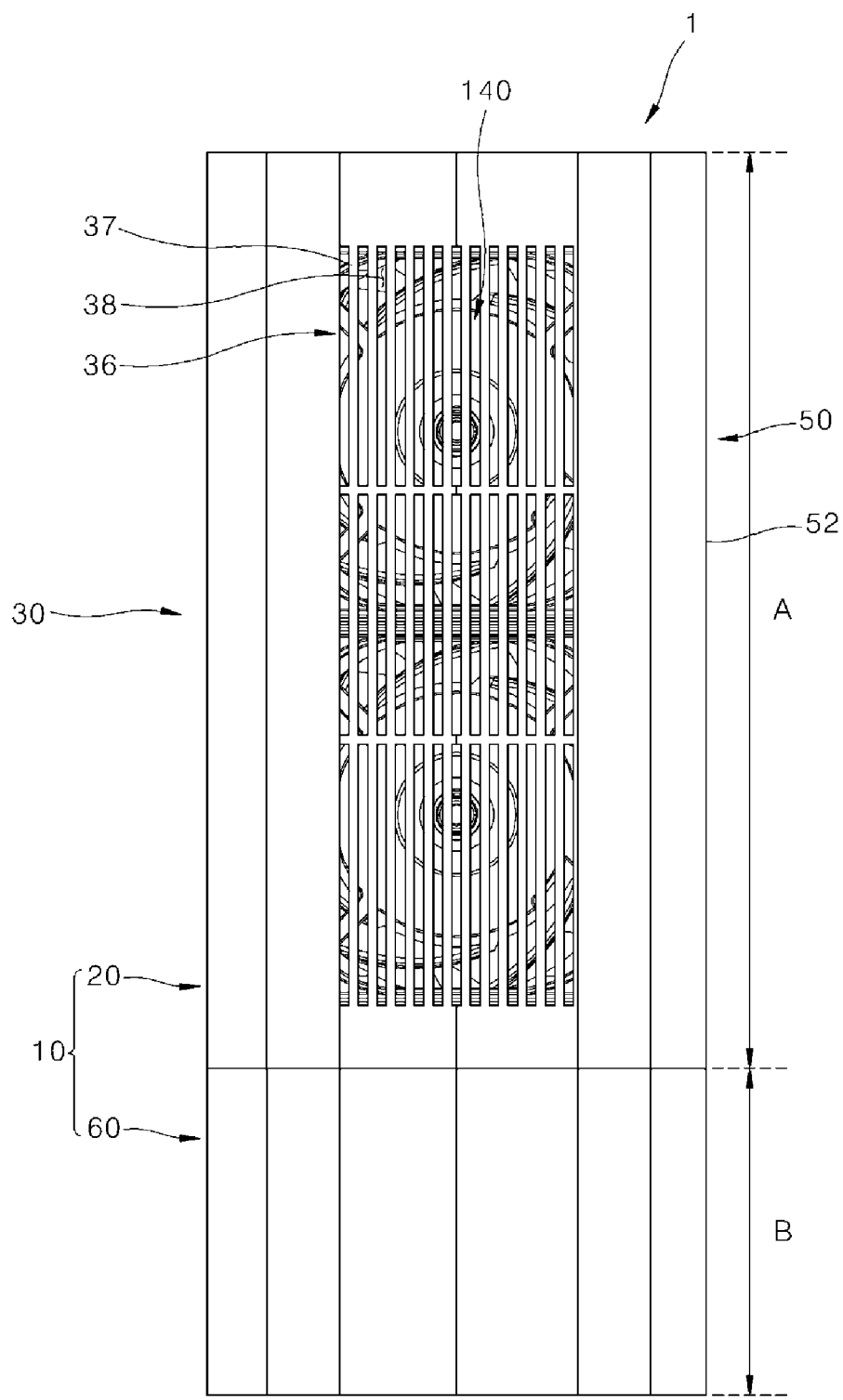
FIG. 2 is a front view of the portable air purifier of FIG. 1.
Figure 3:
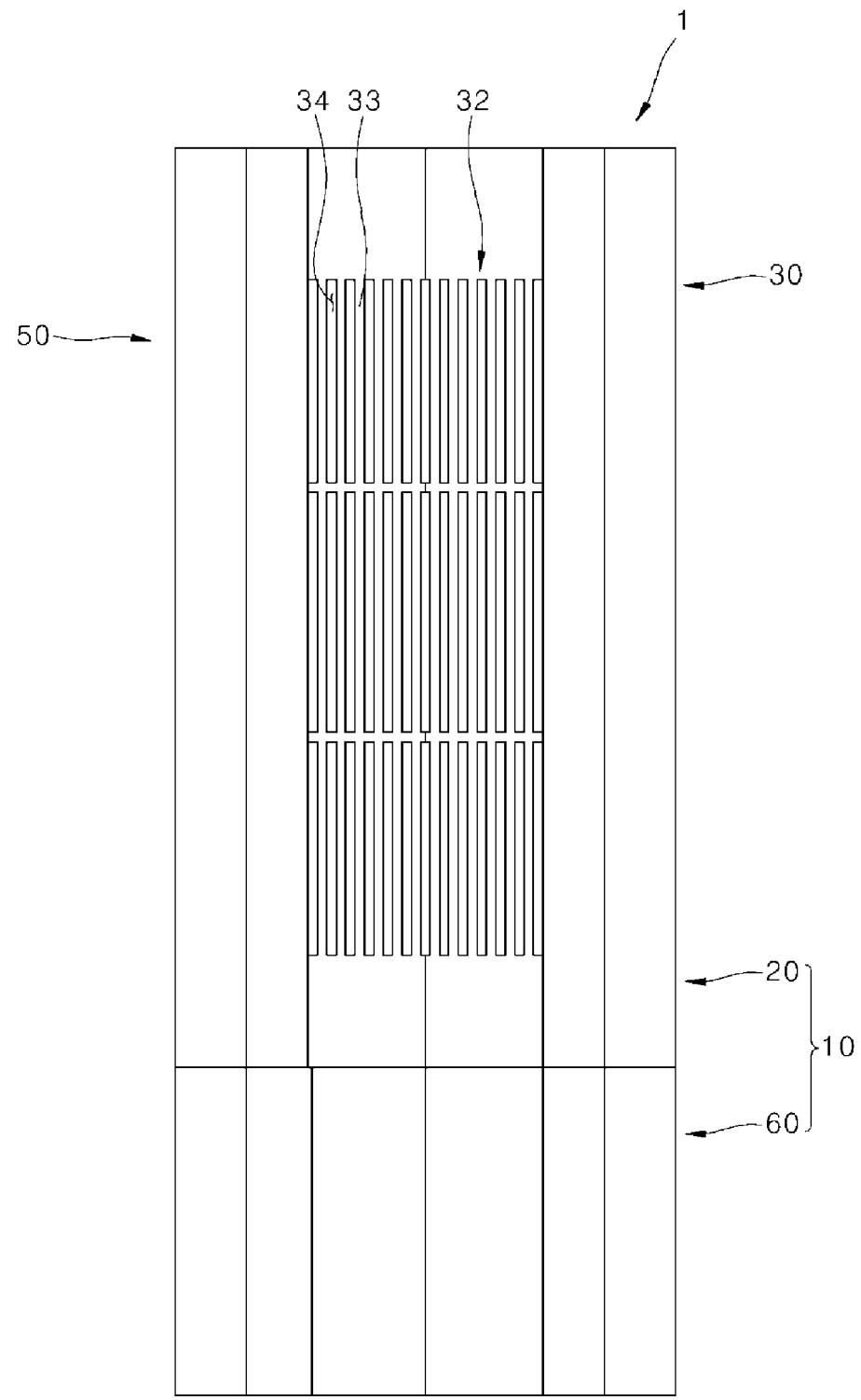
FIG. 3 is a rear view of the portable air purifier of FIG. 1.
Figure 4:
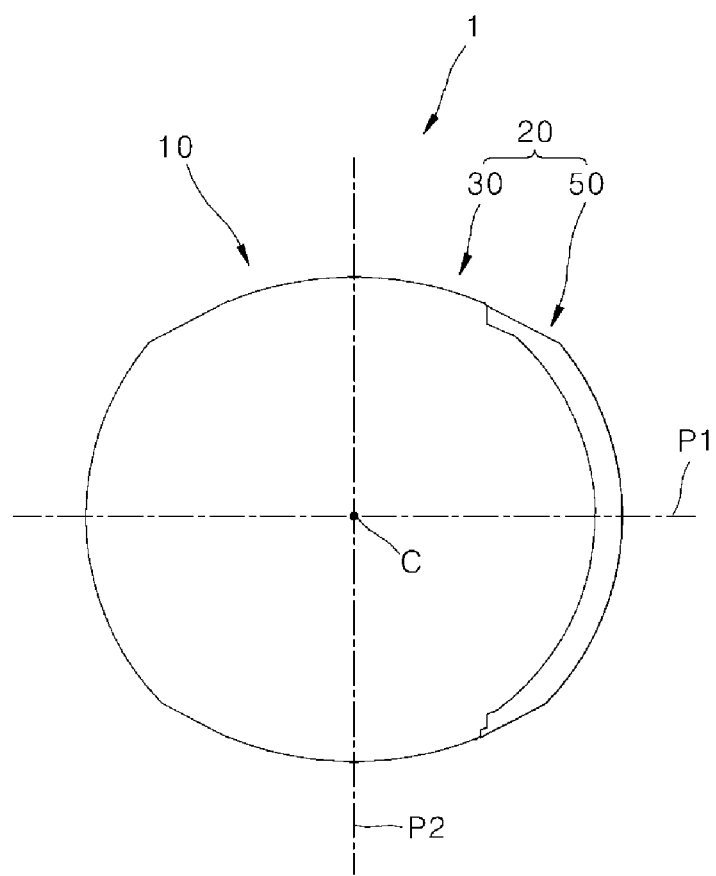
FIG. 4 is a plan view of the portable air purifier of FIG. 1.

FIG. 1 is a perspective view of a portable air purifier according to an embodiment. FIG. 2 is a front view of the portable air purifier of FIG. 1. FIG. 3 is a rear view of the portable air purifier of FIG. 1. FIG. 4 is a plan view of the portable air purifier of FIG. 1.

As illustrated in FIGS. 1 to 4, portable air purifier according to an embodiment may be formed in a substantially cylindrical shape. An outer shape of the portable air purifier 1 is formed by a housing 10. Also, the portable air purifier 1 according to an embodiment may suction air through an inlet 32 provided at one or a first side surface of the housing 10 and discharge air through an outlet 36 provided at the other or a second side surface of the housing 10.

The housing 10 may include a first case 20 and a second case 60. The first case 20 and the second case 60 form a framework of an exterior of the portable air purifier 1. The first case 20 and the second case 60 accommodate a plurality of components.

In the first case 20, both sides may be open in a first direction, which is a longitudinal direction E. That is, both sides of the first case 20 in the longitudinal direction E may be open. The inlet 32 may be disposed at one or a first side of the first case 20 in the first direction, and the outlet 36 may be disposed at the other or a second side of the first case 20 in the first direction.

The inlet 32 and the outlet 36 are installed at side surfaces of the first case 20 which are opposite to each other. Also, as the inlet 32 and the outlet 36 are installed at positions facing each other, air moving through the inlet 32 is moved in a horizontal direction and discharged through the outlet 36. Thus, a movement path of air is shortened, and circulation of air is facilitated.

The second case 60 is connected to a lower side of the first case 20, and the second case 60 may be formed in a cylindrical shape. Alternatively, transverse cross-sections of the first case 20 and the second case 60 may be formed in a circular shape or an elliptical shape, and thus, the first case 20 and the second case 60 may form a shape of a case that extends in a vertical direction.

The portable air purifier 1 may be formed in the shape of a container having a curved surface on an outer side, such as a cylindrical shape or an elliptical columnar shape, that stands upright and extends lengthwise in the vertical direction as a whole. Therefore, the portable air purifier 1 may be inserted into a groove concave toward a lower side, such as a cup holder, and stably mounted. Also, as the outer side of the portable air purifier 1 is bent in a curved shape, a user may easily hold the outer side of the portable air purifier 1 and move the portable air purifier 1.

Directions will be defined. A direction in which the first case 20 is located with respect to the second case 60 may be referred to as "upper portion" or "upper side," and a direction in which the second case 60 is located with respect to the first case 20 may be referred to as "lower portion" or "lower side." Also, "longitudinal direction E" and "first direction" are the same directions, and a direction in which the inlet 32 and the outlet 36 of the housing 10 are connected may be referred to as the longitudinal direction E. Also, "width-wise direction W" and "second direction" are the same directions, and the width-wise direction W is a direction that forms a right angle with the longitudinal direction E and extends in the horizontal direction. Also, both the longitudinal direction E and the width-wise direction W are perpendicular to the vertical direction H. Also, "vertical direction H" and "third direction" are the same directions, and the vertical direction H and the vertical direction are the same directions. The directions are set as above on the basis of when the portable air purifier 1 is coplanar with a horizontal line.

Figure 5:
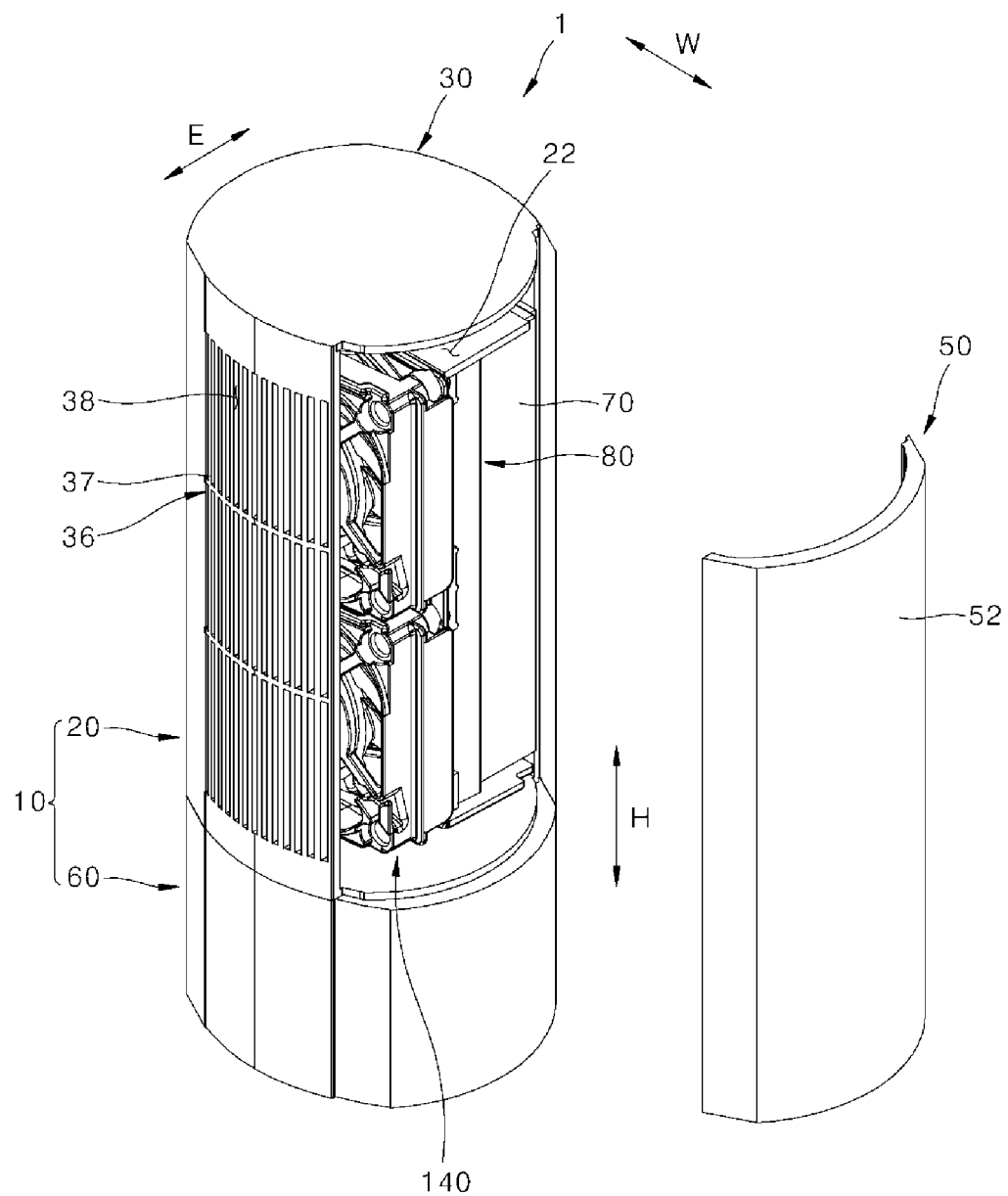
FIG. 5 is a perspective view illustrating a state in which a second case is separated from the portable air purifier of FIG. 1.
Figure 6:
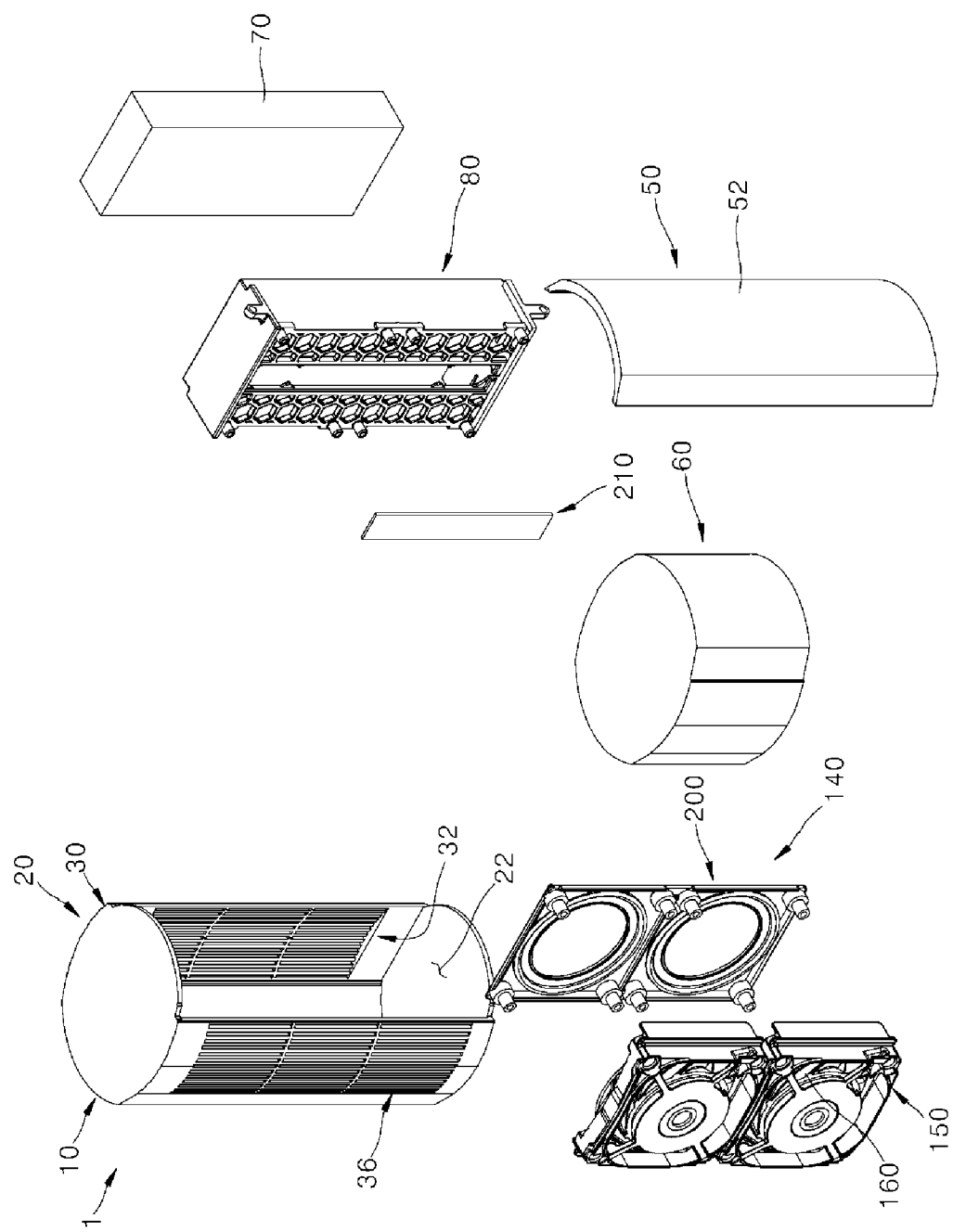
FIGS. 6 and 7 are exploded perspective views of the portable air purifier of FIG. 1.
Figure 7:
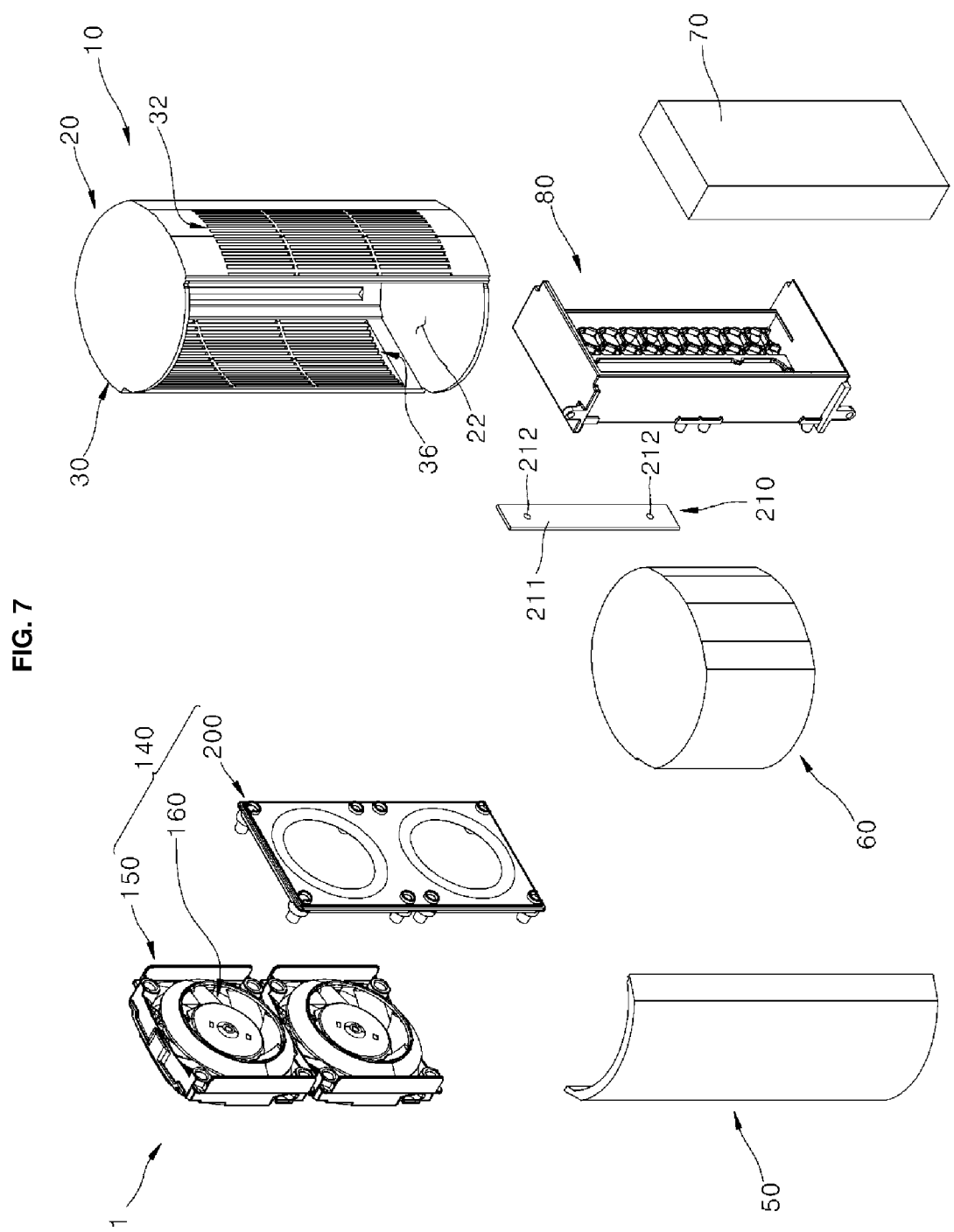

FIG. 5 is a perspective view illustrating a state in which the second case is separated from the portable air purifier of FIG. 1. FIGS. 6 and 7 are exploded perspective views of the portable air purifier of FIG. 1.

As illustrated in FIGS. 5 to 7, the portable air purifier according to an embodiment may include the housing 10, a filter 70, a fan module 140, a filter case 80, and a sanitizing portion 210. The first case 20 and the second case 60 form the framework of the exterior of the portable air purifier 1. An accommodation space 22 may be formed inside of the first case 20 and the second case 60. The accommodation space 22 may accommodate the filter 70, the filter case 80, the fan module 140, the sanitizing portion 210, and electronic components including a battery 220. The first case 20 and the second case 60 may be formed to have a sufficient strength to protect the accommodated components from external impact.

The filter 70 may be installed in the accommodation space 22 of the first case 20 and may be disposed between the fan module 140 and the inlet 32. That is, the filter 70 may be spaced a predetermined distance apart from the fan module 140 and be disposed at one side of the fan module 140 in the longitudinal direction E. Therefore, the filter 70 may serve to purify air that is suctioned through the inlet 32 of the portable air purifier. Air purified while passing through the filter 70 may pass through the fan module 140 and the outlet 36 and be discharged in a lateral direction of the portable air purifier.

The filter 70 made be made of a single filter, or as necessary, installed in a state in which a plurality of stacked filters. Also, the filter 70 may be fixed by the filter case 80. The filter case 80 is fixed to the inside of the first case 20, and an insertion space to accommodate the filter 80 may be formed inside of the filter case 80.

The fan module 140 may be accommodated in the accommodation space 22 inside of the first case 20 and may be disposed between the outlet 36 and the filter 70. More specifically, the fan module 140 may be disposed between the outlet 36 and the filter case 80. Also, the sanitizing portion 210 may be installed inside of the filter case 80 or installed between the filter case 80 and the fan module 140. In this way, various modifications are possible.

The fan module 140 may be disposed at the second side of the filter 70 in the first direction, and the outlet 36 may be disposed at the second side surface of the first case 20 that faces the fan module 140. The fan module 140 serves to suction air, which enters one or a first side surface of the filter 70 through the inlet 32, and discharge the air to the other or a second side of the first case 20 through the outlet 36 provided at the second side surface of the first case 20.

In this embodiment, the fan module 140 is illustrated as including a diagonal flow fan. The fan module 140 may suction air, which has passed through the filter 70, in the axial direction and discharge the air in a direction between the axial direction and the radial direction.

The sanitizing portion 210 may be disposed between the filter 70 and the fan module 140 and may be fixed to at least any one of the filter case 80 or the fan module 140. The sanitizing portion 210 may be fixed to the filter case 80. However, according to another embodiment, the sanitizing portion 210 may be fixed to the fan module 140, fixed between the fan module 140 and the filter case 80, or fixed to the housing 10. In this way, various modifications are possible.

In a case in which the sanitizing portion 210 is fixed to the fan module 140, as a separate bracket to fix the sanitizing portion 210 to the fan module 140 is necessary, production costs increase. Also, as the sanitizing portion 210 is installed in a shape that protrudes from an outer side of the fan module 140, sizes of the filter case 80 and the filter 70 are relatively reduced, and thus, air filtering performance may be degraded. Also, in a case in which the sanitizing portion 210 is installed to be integrally formed with the inside of the fan module 140, there is a problem in that, as a size of a fan is reduced due to installation of the sanitizing portion 210, an air blowing ability is degraded. Also, in a case in which the sanitizing portion 210 is installed in the fan module 140, there may be a problem in that the air blowing ability is degraded due to an increase in frictional resistance between the sanitizing portion 210 and the air suctioned through an inlet of the fan module 140.

In order to address the above problems, the sanitizing portion 210 is fixed to the filter case 80. As the sanitizing portion 210 according to embodiments is fixed to the filter case 80, sanitizing light irradiated by the sanitizing portion 210 may be irradiated toward the filter 70 without interfering with the filter case 80, and thus, degradation in sanitization performance of the sanitizing portion 210 may be prevented. In a case in which the sanitizing portion 210 is fixed to the fan module 140, as the sanitizing light irradiated by the sanitizing portion 210 interferes with the filter case 80 fixing the filter 70, sanitization performance of the sanitizing portion 210 may be degraded.

Also, the filter case 80, the sanitizing portion 210, and the filter 70 form a single module and are mounted inside of the housing 10. As the sanitizing portion 210 sanitizes the filter 70 by irradiating the filter 70 with sanitizing light, an installation position of the sanitizing portion 210 and a distance between the filter 70 and the sanitizing portion 210 are important design factors.

Therefore, in a case in which the filter case 80, the sanitizing portion 210, and the filter 70 are installed to form a single module, even when an installation position of the fan module 140, for example, is changed according to a model of the portable air purifier, a distance between the sanitizing portion 210 and the filter 70 is a fixed design factor. Thus, sanitization of the filter 70 may be stably performed, and cost increase due to changing the design may be reduced.

Further, as the sanitizing portion 210 is installed in a state of being inserted into the filter case 80, a separate bracket to fix the sanitizing portion 210 is not necessary, and thus, production costs may be reduced. Furthermore, as the sanitizing portion 210 is installed in the state of being inserted into the filter case 80, a size reduction of the fan module 140 and the filter 70 due to installing the sanitizing portion 210 may be prevented, and thus, degradation of the air blowing ability and air filtering ability may be prevented.

Also, as the sanitizing portion 210 fixed to the filter case 80 is installed in a state of being spaced apart from the fan module 140, an area of the inlet through which air is suctioned into the fan module 140 is not decreased. However, in a case in which the sanitizing portion 210 is fixed to the fan module 140, an area of the inlet through which air is suctioned into the fan module 140 may be decreased, and thus, the air blowing ability may be degraded. Therefore, the sanitizing portion 210 may be fixed to at least one of the filter case 80, the fan module 140, or the housing 10, but as set forth above, it is advantageous for the sanitizing portion 210 to be fixed to the filter case 80.

The sanitizing portion 210 may be spaced a predetermined distance apart from the filter 70 and irradiate the filter 70 with the sanitizing light. As the sanitizing light irradiated by the sanitizing portion 210 is harmful to the human body, the installation position of the sanitizing portion 210 is set such that the sanitizing light does not leak to the outside of the portable air purifier through the inlet 32. Also, as the sanitizing portion 210 is installed between the filter 70 and the fan module 140 and sanitizes the filter 70, contamination of air may be prevented. The sanitizing portion 210 may be installed between the filter case 80, which supports the filter 70, and the fan module 140, and the filter 70 may be sanitized by the sanitizing light irradiated by the sanitizing portion 210. Also, as the sanitizing portion 210 is installed between the fan module 140 and the filter 70, and the sanitizing light is irradiated toward the filter 70 which blocks the inlet 32, the sanitizing light which is harmful to the human body may be prevented from being exposed to the outside of the housing 10.

The battery 220 may be installed in the accommodation space 22 provided inside of the second case 60 and may supply power to drive the portable air purifier.

Figure 8:
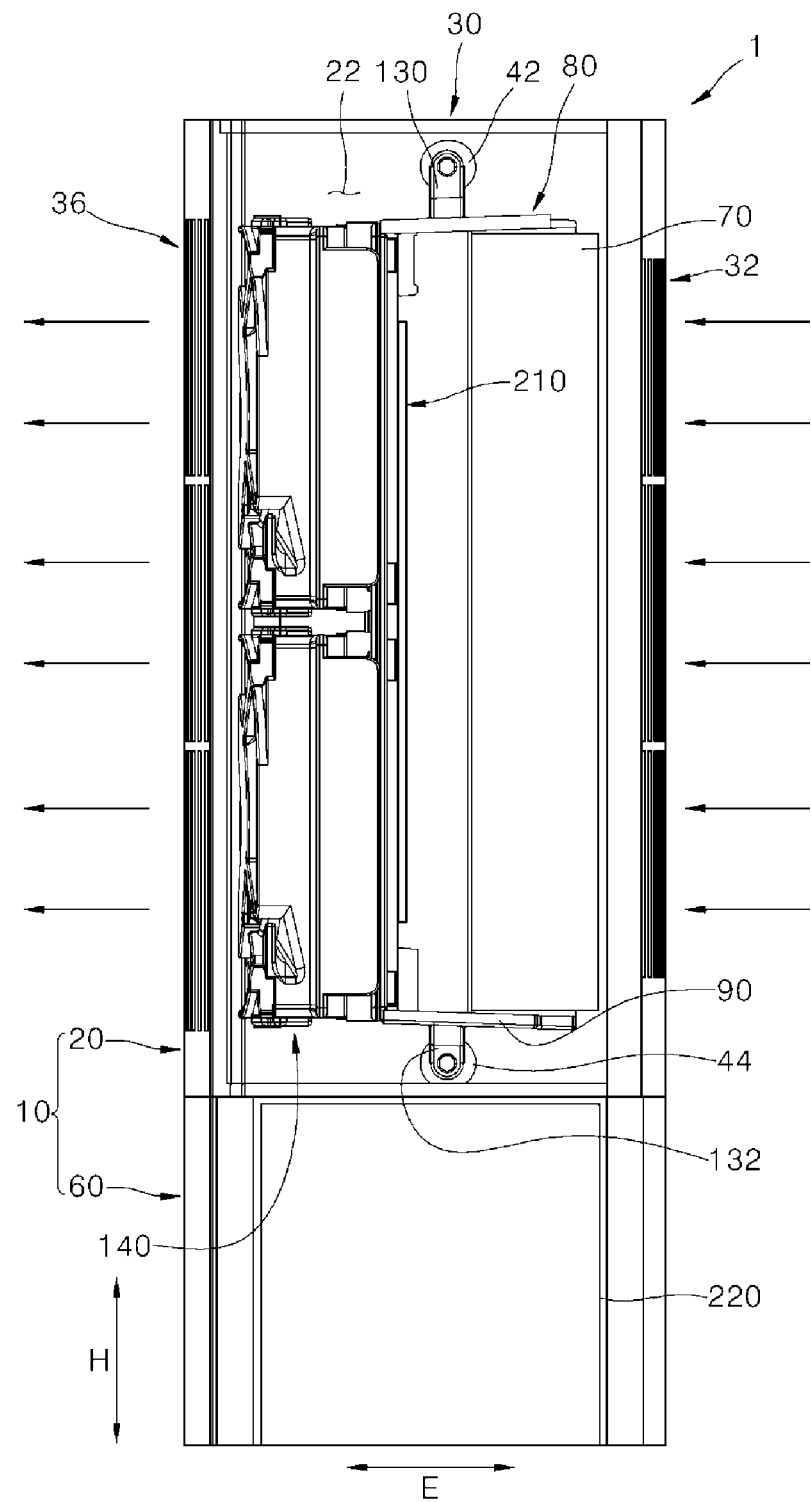
FIG. 8 is a view illustrating an air flow path passing through the portable air purifier according to an embodiment in a horizontal direction.
Figure 10:
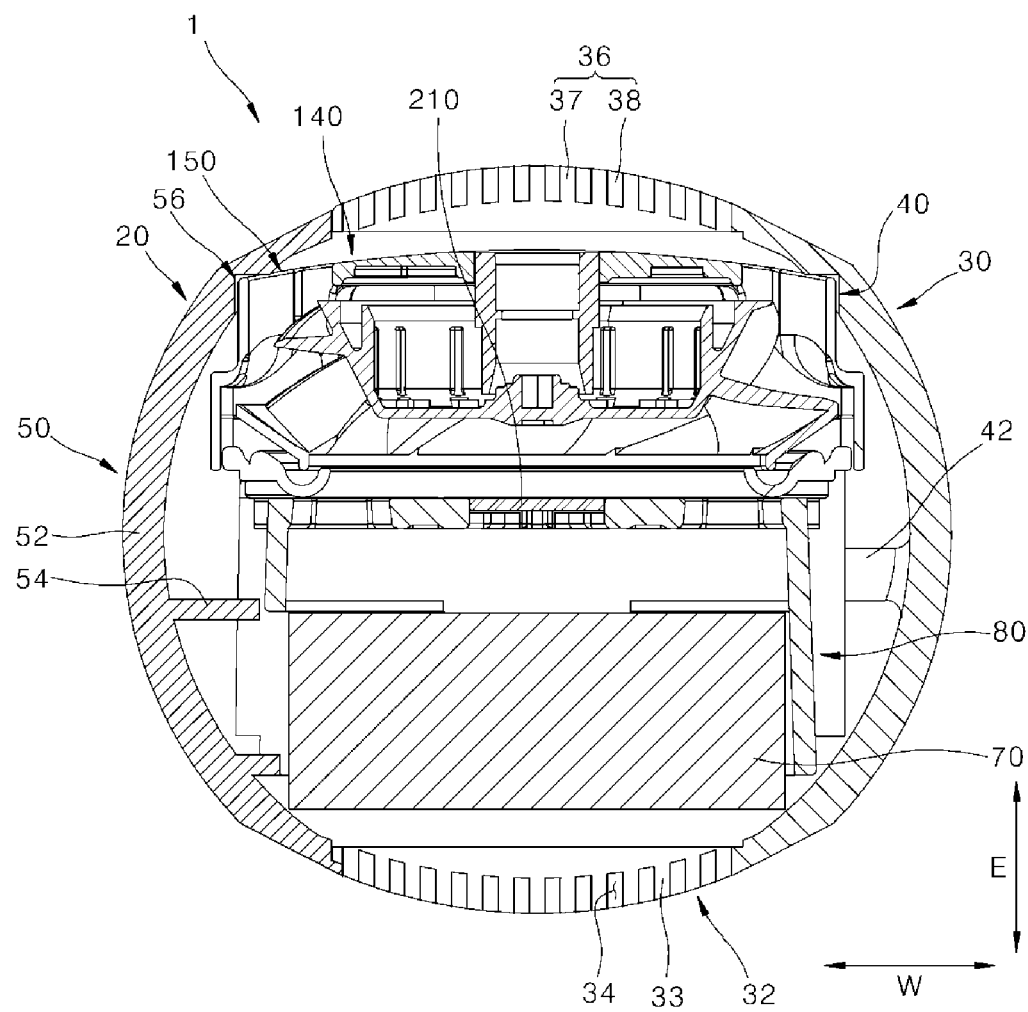
FIG. 10 is a plan cross-sectional view of the portable air purifier according to an embodiment.
Figure 11:
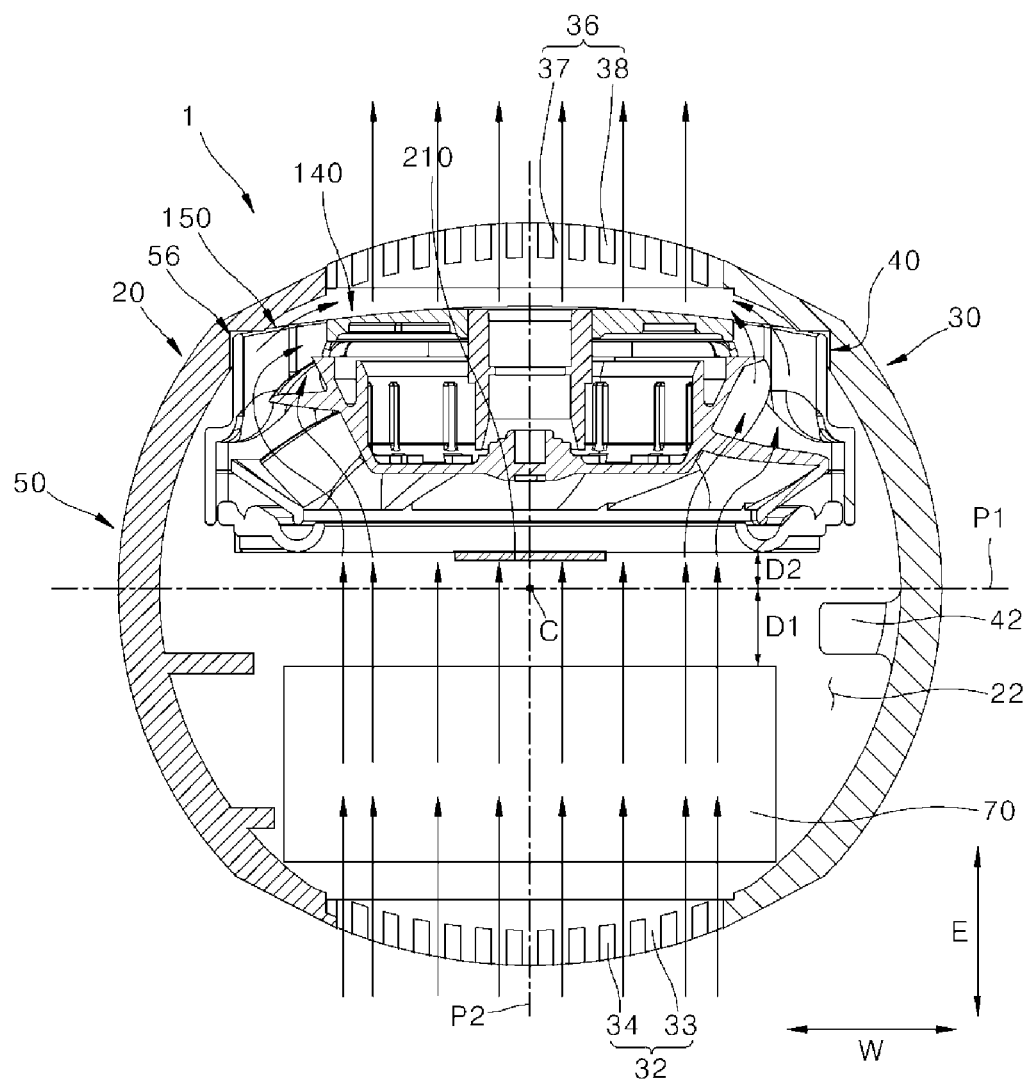
FIG. 11 is a view illustrating a movement direction of air passing through the portable air purifier according to an embodiment.

FIG. 8 is a view illustrating an air flow path passing through the portable air purifier according to an embodiment in the horizontal direction. FIG. 10 is a plan cross-sectional view of the portable air purifier according to an embodiment. FIG. 11 is a view illustrating a movement direction of air passing through the portable air purifier according to an embodiment.

As illustrated in FIGS. 2, 8, 10, and 11, the accommodation space 22 provided inside of the portable air purifier may be divided into a first area A and a second area B. When the accommodation space 22 is divided in the vertical direction H, an upper area is the first area A, and a lower area is the second area B. Note that the first area A and the second area B are not physically partitioned areas and are areas that are only conceptually divided.

In this embodiment, the accommodation space 22 of the first case 20 forming the framework of the portable air purifier is set as the first area A, and the accommodation space 22 inside of the second case 60 is set as the second area B. Components relating to suctioning, purifying, and discharging air are disposed in the first area A. That is, the inlet 32, the filter 70, the fan module 140, and the outlet 36 are disposed in the first area A, and as necessary, the filter case 80 and the sanitizing portion 210 may be further installed in the first area A. Therefore, in the first area A, air flows in the horizontal direction by passing through the first case 20.

The inlet 32 having a plurality of inlet holes 34 formed therein is installed as a path for suctioning air at a first side (the right side based on FIG. 8) of the first case 20. The outlet 36 having a plurality of outlet holes 38 formed therein is provided as a path to discharge the air, which is purified in the first area A, at a second side (the left side based on FIG. 8) of the first case 20. Therefore, an air flow path in the longitudinal direction E that connects the inlet 32, the filter 70, the fan module 140, and the outlet 36 is formed inside of the first case 20. That is, the inlet 32, the filter 70, the filter case 80, the sanitizing portion 210, and the outlet 36 are provided in the first area A, and a flow path for the air, which is suctioned into the portable air purifier 1, to pass through the inside of the air purifier 1 is formed in the first area A.

Components not directly related to a flow of air for purifying air are disposed in the second area B. That is, a controller, which includes a printed circuit board (PCB), and the battery 220 may be installed in the second area B.

According to this embodiment, the first case 20 and the second case 60 are formed in a cylindrical shape or an elliptical columnar shape in which a length in the vertical direction H is longer than a length in the lateral direction. Also, the first area A disposed at an upper portion is formed to have a longer length in the vertical direction H than the second area B disposed at a lower portion. That is, when the portable air purifier 1 stands upright, the first area A at the upper portion occupies a larger area than the second area B at the lower portion.

The battery 220 may be installed inside of the second case 60 in which the second area B is formed. The battery 220 may have a heavier weight than a sum of weights of the fan module 140, the filter 70, the filter case 80, and the sanitizing portion 210.

Generally, as a weight per unit volume of the battery 220 is significantly heavier than a weight per unit volume of the fan module 140, the filter 70, the filter case 80, and the sanitizing portion 210, even when the weight or size of the battery 220 is not intentionally increased, the battery 220 has a heavier weight than the fan module 140, the filter 70, the filter case 80, and the sanitizing portion 210. When the battery 220, which is a heavy object, is disposed in the lower portion of the portable air purifier 1, a center of mass of the portable air purifier 1 is biased toward the lower side from the center in the vertical direction H. That is, the center of mass of the portable air purifier 1 is moved toward the lower portion of the portable air purifier 1 at which the battery 220 is disposed. When the center of mass of the portable air purifier 1 is biased toward the lower side of the portable air purifier 1 at which the battery 220 is disposed, a risk of the portable air purifier 1 falling down when the portable air purifier 1 stands upright is reduced. That is, when the portable air purifier 1 stands upright, as the center of mass of the portable air purifier 1 is located at the lower side due to the battery 220 being disposed at the lower portion of the portable air purifier 1, the portable air purifier 1 does not fall down easily.

Also, when the battery 220, which is a heavy object, is disposed in the lower portion of the portable air purifier 1, other components of the portable air purifier 1 should be disposed above the battery 220. That is, the components relating to suctioning, purifying, and discharging air and the sanitizing portion 210 for sanitizing the filter 70 should be disposed at a higher position than the battery 220.

In order to secure a charge capacity of the battery 220 necessary for smooth use of the portable air purifier 1, a size of the battery 220 is required to be a predetermined size or larger. Therefore, an installation space of a predetermined size or more for installing the battery 220 is also required inside of the portable air purifier 1. As it is difficult to form a flow path for an air flow in the space in which the battery 220 is installed, components relating to suctioning, purifying, and discharging air are inevitably disposed at positions avoiding the battery 220, that is, positions higher than the battery 220.

Due to such an arrangement, the flow path for suctioning, purifying, and discharging air is formed in the first area A, which is at a higher position than the battery 220, in the portable air purifier 1. Therefore, suctioning of air into the portable air purifier 1 and discharge of air purified by the portable air purifier 1 are also performed at a position higher than a position at which the battery 220 is installed.

When the discharge of the purified air is performed at the upper portion of the portable air purifier 1 as described above, it becomes easier for the air purified by the portable air purifier 1 to reach the face of a user. When the portable air purifier 1 is used while placed on a floor surface at a lower position than the user's face, in order to increase an amount of air purified by the portable air purifier 1 that reaches the user's face, using the portable air purifier 1 in a vertical state is more advantageous than using the portable air purifier 1 in a horizontal state. Thus, when the portable air purifier 1 stands upright, the amount of air purified by the portable air purifier 1 that reaches the user's face may be further increased when the discharge of the purified air is performed at the upper portion of the portable air purifier 1.

Also, the structure in which the battery 220, which is a heavy object, is disposed in the lower portion of the portable air purifier 1, and accordingly, the components relating to suctioning, purifying, and discharging air are disposed at a higher position than the battery 220 may also contribute to expanding a range of installation of the portable air purifier 1. For example, when the portable air purifier 1 is used while inserted into a cup holder in a vehicle, an area where suctioning of air is performed and an area where purifying and discharging of air are performed may be disposed at a higher position than the cup holder. Accordingly, the air purifying performance may be maintained at a high level while the portable air purifier 1 is stably mounted in the vehicle. A length of the second area B in the vertical direction H in which the battery 220 is disposed may be set to be larger than or equal to a depth of the cup holder.

As another example, even in a case in which a lower area of the portable air purifier 1 is fixed using a cradle in the form of tongs, for example, the portable air purifier 1 may be stably fixed while an area of the portable air purifier 1 where suctioning of air is performed and an area of the portable air purifier 1 where discharging of the purified air is performed are not blocked.

Even in a case in which a user moves the portable air purifier 1 while holding the lower portion of the portable air purifier 1 by his or her hand, stable movement of the portable air purifier 1 is possible without blocking the area of the portable air purifier 1 where suctioning of air is performed and the area of the portable air purifier 1 where discharging of the purified air is performed. That is, as components not directly related to a flow of air for purifying air are disposed at the lower portion of the portable air purifier 1, and mounting and fixing of the portable air purifier 1 are performed through the lower portion of the portable air purifier 1, the portable air purifier 1 may simultaneously provide air purifying performance at a high level and be stably fixed.

In the portable air purifier 1 according to an embodiment having the above structure, the first case 20 including the inlet 32 and the outlet 36 is installed at the upper side of the second case 60. The first case 20 is connected to the upper side of the second case 60 in which electronic components are installed, and the inlet 32 configured to suction air and the outlet 36 configured to discharge air are provided in the first case 20. Therefore, in a state in which the first case 20 is inserted into a structure, such as a cup holder, having the shape of a groove which is concave toward the lower side, air is easily suctioned into the first case 20 through the inlet 32 and then air is discharged in the lateral direction of the first case 20 through the outlet 36 of the first case 20. Thus, air purification efficiency may be improved.

The space inside of the first case 20 may be divided into a direction toward the inlet 32 and a direction toward the outlet 36 with respect to a first horizontal center line P1. The first horizontal center line P1 is a virtual line that passes through the center of the housing 10 and extends in the horizontal direction. Also, the first horizontal center line P1 is located at the center of the inlet 32 and the outlet 36.

With respect to the first horizontal center line P1, the filter 70 may be disposed in the direction toward the inlet 32, and the fan module 140 and the sanitizing portion 210 may be disposed in the direction toward the outlet 36. Therefore, air that has passed through the inlet 32 may pass through the filter 70 such that foreign substances may be removed from the air. In this state, the air moves to the inside of the fan module 140. Therefore, as it is possible to prevent the fan module 140 from being contaminated due to the foreign substances contained in the air, durability of the fan module 140 may be improved, and maintenance and repair costs may also be reduced.

As the sanitizing portion 210 sanitizes the filter 70 using sanitizing light, an irradiation distance for irradiating the sanitizing light is essential. Therefore, in a case in which the sanitizing portion 210 is located on the first horizontal center line P1 or is installed in an area toward the inlet 32 with respect to the first horizontal center line P1, as an installation area of the filter 70 is excessively reduced, there is a problem in that air purification performance is degraded.

The area toward the inlet 32 with respect to the first horizontal center line P1 is an area between the first horizontal center line P1 and the inlet 32 as illustrated in FIG. 11. Therefore, in a case in which the sanitizing portion 210 is installed in an area located between the first horizontal center line P1 and the outlet 36, an irradiation distance for irradiating the sanitizing light from the sanitizing portion 210 toward the filter 70 may be stably secured. As it is possible to secure an installation area of the filter 70 for removing impurities from air entering through the inlet 32, degradation of air purification performance may be prevented.

However, in a case in which the sanitizing portion 210 is installed on the first horizontal center line P1 or is installed between the first horizontal center line P1 and the inlet 32, it is not possible to stably secure the irradiation distance for irradiating the sanitizing light from the sanitizing portion 210 toward the filter 70. Therefore, as sanitization of the filter 70 is not able to be properly performed, contaminated air may be discharged.

In a case in which an installation area of the filter 70 is reduced to secure the irradiation distance for irradiating the sanitizing light from the sanitizing portion 210 toward the filter 70, air purification performance may be degraded. In order to address the above problems, the sanitizing portion 210 may be installed in an area toward the outlet 36 with respect to the first horizontal center line P1. Thus, the installation area of the filter 70 may be increased, and degradation of air purification performance may be prevented.

However, in a case in which a separate fixing bracket to fix the sanitizing portion 210 is added, an installation area of the fan module 140 may be decreased, and thus, there is a problem in that air purification performance is degraded due to degradation of the air blowing ability of the fan module 140. In order to address the above problem, a separate fixing bracket is not added to fix the sanitizing portion 210, and the sanitizing portion 210 is fixed between the filter case 80 and the fan module 140 or fixed inside of the filter case 80. Thus, an increase in resistance of an air flow path may be minimized, and air purification performance may be improved.

That is, as a front surface of the sanitizing portion 210 is supported by the filter case 80 and a rear surface of the sanitizing portion 210 is supported by the fan module 140, it is not required to additionally install a separate fixing bracket to fix the sanitizing portion 210, and thus, an increase in resistance of an air flow path may be minimized. Further, as the installation area of the fan module 140 is not decreased, degradation of the air blowing ability of the fan module 140 may be prevented, and thus, degradation of air purification performance may also be prevented.

The filter 70 may be disposed inside of the inlet 32 and installed in a state in which both sides of the filter 70 in the width-wise direction W contact the inside of the first case 20. Therefore, the sanitizing light irradiated toward the filter 70 which blocks the inlet 32 is prevented from leaking to the outside of the housing 10, and thus, a safe usage environment may be provided.

Figure 9:
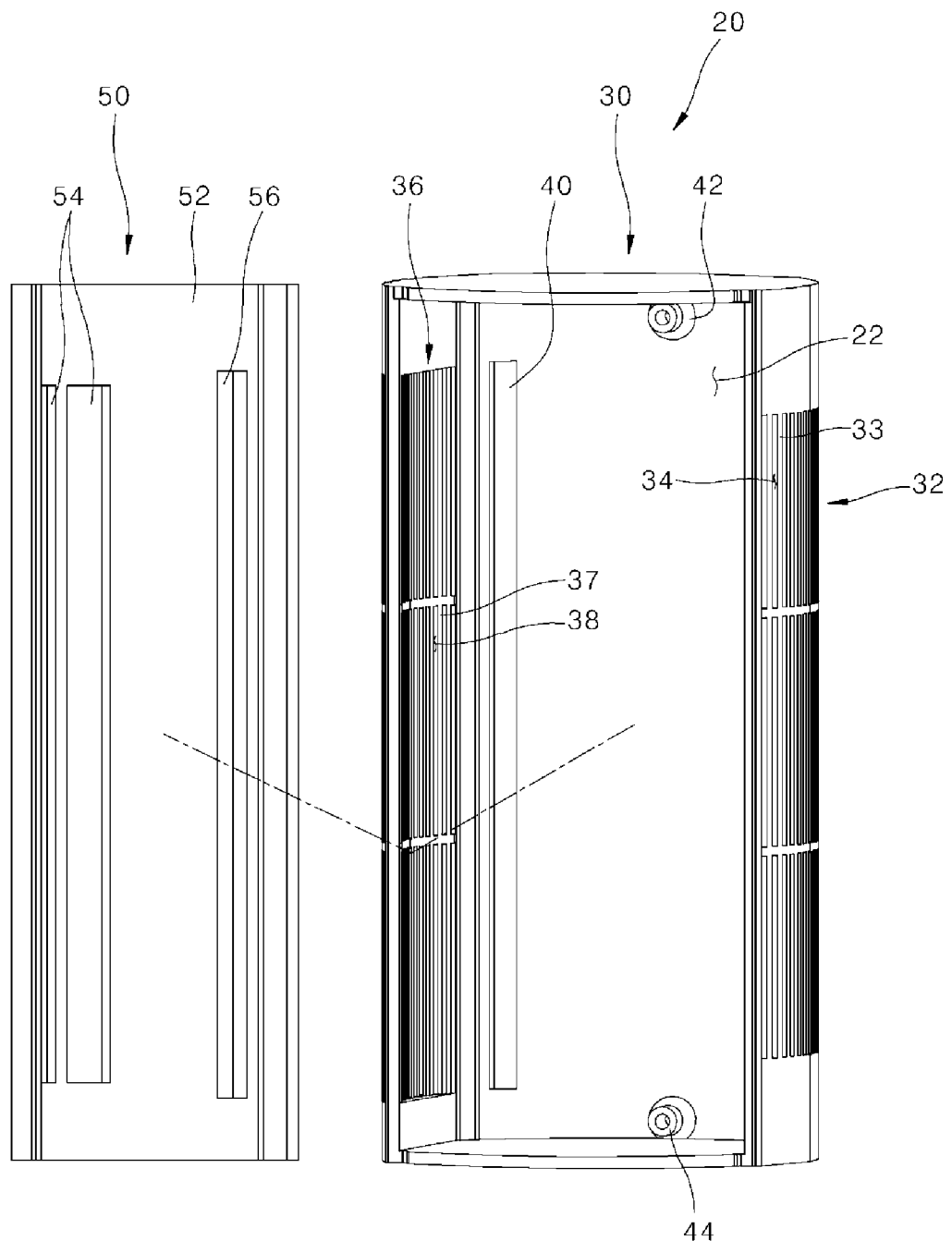
FIG. 9 is an exploded perspective view of a housing according to an embodiment.

FIG. 9 is an exploded perspective view of a housing according to an embodiment. As illustrated in FIGS. 8 and 9, the portable air purifier 1 according to an embodiment may include at least one of housing 10, filter 70, filter case 80, fan module 140, sanitizing portion 210, or battery 220.

The housing 10 has accommodation space 22 formed therein and may be modified in various ways within the technical spirit in which the housing 10 includes the inlet 32 configured to suction air and the outlet 36 configured to discharge air. The housing 10 according to an embodiment may include first case 20 and second case 60.

The filter 70, the sanitizing portion 210, and the fan module 140 may be installed inside of the first case 20. The inlet 32 may be provided at one or the first side surface of the first case 20, and the outlet 36 may be provided at the other or the second side surface of the first case 20 that faces the inlet 32. The first case 20 may be made of a single member or component or may be made of a plurality of members or components as necessary. The first case 20 according to an embodiment may include first case body 30 and service door 50.

The accommodation space 22 is formed inside of the first case body 30, the inlet 32 is provided at the first side surface of the first case body 30, and the outlet 36 is provided at the second side surface of the first case body 30 that faces the inlet 32. The first case body 30 may be formed in the shape of a pipe having a cylindrical or elliptical transverse cross-section, or as necessary, the first case body 30 may have a cross-section formed in a shape in which a diameter in the width-wise direction W is longer than a diameter in the longitudinal direction E and may extend in the vertical direction. A side surface of the first case body 30 may be open to form a service space, and the service door 50 may be detachably installed at the side surface of the first case body 30.

The first case body 30, which includes the inlet 32 and the outlet 36 and includes the service space formed at the side surface, may have in a shape in which an upper side and a lower side of the first case body 30 are blocked. The service door 50 may be installed at the first case body 30 so as to be easily detachable to open and close the service space.

The first case body 30 according to an embodiment may include at least one of the inlet 32, the outlet 36, a second mounting groove 40, a first boss 42, or a second boss 44. The inlet 32 may include inlet grilles 33 that extend in the vertical direction, and inlet holes 34 may be provided between the plurality of inlet grilles 33. The plurality of inlet grilles 33 may be installed at one side surface of the housing 10 to form the inlet holes 34. As a transverse cross-section of the inlet grilles 33 extends in the longitudinal direction E, the inlet holes 34 disposed between the inlet grilles 33 are also formed in the longitudinal direction E. Therefore, movement of air that enters through the inlet 32 is guided in the longitudinal direction E.

As the inlet holes 34 guide a flow of air, which enters the first case 20, in the longitudinal direction E, a movement path of air passing through the first case 20 is shortened, and a larger amount of air may be purified within a short time. Thus, air purification efficiency may be improved.

As the inlet 32 extends in the vertical direction at one side surface of the first case 20, the one side surface of the first case 20 is utilized as a space for suctioning air. Also, as the inlet 32 is formed along the one side surface of the first case 20 that has a curved shape, the number of inlet holes 34 is increased as compared to when the inlet 32 is installed along a straight line so as to be parallel to the filter 70. As a suction flow rate of air increases according to the shape of the inlet 32, air purification efficiency may be improved.

The outlet 36 may include outlet grilles 37 that extend in the vertical direction, and outlet holes 38 may be provided between the plurality of outlet grilles 37. The plurality of outlet grilles 37 may be installed at the other side surface of the housing 10 to form the outlet holes 38 for discharging air. As a transverse cross-section of the outlet grilles 37 extends in the longitudinal direction E, the outlet holes 38 disposed between the outlet grilles 37 are also formed in the longitudinal direction E. Therefore, movement of air being discharged through the outlet 36 may be guided in the longitudinal direction E along the outlet grilles 37.

As the outlet holes 38 guide a flow of air, which is discharged to the outside of the first case 20, in the longitudinal direction E, the outlet holes 38 induce the movement path of air, which passes through the first case 20 as well as the inlet 32, to be shortened. Also, as the outlet 36 extends in the vertical direction at the other side surface of the first case 20, most of the space of the other side surface of the first case 20 may be utilized as a space for discharging air. As the outlet 36 is formed along the other side surface of the first case 20 that has a curved shape, the number of outlet holes 38 is increased as compared to when the outlet 36 is installed along a straight line so as to be parallel to the fan module 140. As a discharge flow rate of air increases according to the shape of the outlet 36, air purification efficiency may be improved.

The inlet holes 34 and the outlet holes 38 may be installed to face each other in the horizontal direction. As the inlet holes 34 and the outlet holes 38 are installed at positions facing each other in the longitudinal direction E, air that enters through the inlet holes 34 may be moved in the horizontal direction and then discharged to the outside of the first case 20 through the outlet holes 38. Therefore, the movement path of air passing through the first case 20 is induced to have a shortest possible length so that frictional resistance is minimized during movement of air, and an air blowing ability is improved to allow a larger amount of air to be purified within a short time. Thus, air purification efficiency may be improved. Also, power consumption for operation of the fan module 140 may be reduced to reduce an electric bill.

A length of the inlet 32 in the width-wise direction W may be shorter than a length of the filter 70 in the width-wise direction W. Therefore, as air that enters through the inlet 32 is purified while passing through the filter 70, the air purification performance may be improved. In a case in which the length of the inlet 32 in the width-wise direction W is less than or equal to the length of the filter 70 in the width-wise direction W, air that enters through the inlet 32 may immediately move to the fan module 140 without passing through the filter 70, and thus, an air purification ability may be degraded.

The first boss 42 and the second boss 44 which are formed as protrusions that protrude to the inside of the first case body 30 are coupled to the filter case 80 to restrict movement of the filter case 80. The first boss 42 and the second boss 44 are installed inside of the first case body 30 that faces the service door 50 and fix a first fixing protrusion 130 and a second fixing protrusion 132 of the filter case 80, which will be described hereinafter. As the first boss 42 and the second boss 44 are installed at positions facing the service door 50, the first boss 42 and the second boss 44 are visible to a worker in a state in which the service door 50 is separated. Therefore, as the filter case 80, to which the first boss 42 and the second boss 44 are fastened, may be easily separated, it is possible to reduce the time and cost required for maintenance and repair work, including replacing the filter 70.

One or a first side and the other or a second side of the fan module 140 in the width-wise direction W may be inserted into a first mounting groove 56 and a second mounting groove 40 such that movement thereof is restricted. The first mounting groove 56 may be a groove that extends in the vertical direction inside of the service door 50, and the second mounting groove 40 may be a groove that extends in the vertical direction inside of the first case body 30.

As the first mounting groove 56 and the second mounting groove 40 are disposed at both sides of the outlet 36 in the width-wise direction W, and both side corners of the fan module 140 are inserted into the first mounting groove 56 and the second mounting groove 40, the fan module 140 may be stably fixed. Further, as a separate bracket to fix the fan module 140 is not used, the portable air purifier 1 may be designed to have a small size, and production costs and maintenance and repair costs may be reduced due to a decrease in the number of components.

The service door 50 may be detachably installed at the first case body 30 and may be modified in various ways within the technical spirit in which the service door 50 opens and closes the service space provided at the side surface of the first case body 30. The service door 50 according to an embodiment may include at least any of a door body 52, a gap maintaining protrusion 54, or the first mounting groove 56.

The door body 52 may be modified in various ways within the technical spirit in which the door body 52 opens and closes the service space which is open at the side surface of the first case body 30. The door body 52 according to an embodiment may have a transverse cross-section formed in a curved shape and extend in the vertical direction. The door body 52 may be detachably installed at a side surface of the first case 20 which is disposed between the inlet 32 and the outlet 36.

The gap maintaining protrusion 54 may protrude to the inside of the door body 52 and may be modified in various ways within the technical spirit in which the gap maintaining protrusion 54 extends toward at least one of the filter 70 or the filter case 80. The gap maintaining protrusion 54 according to an embodiment may be formed in the shape of a plate and protrude to the inside of the door body 52 to contact side surfaces of the filter case 80 and the filter 70 or be spaced a predetermined distance apart therefrom.

A plurality of the gap maintaining protrusions 54, and the plurality of gap maintaining protrusions 54 may contact the side surfaces of the filter case 80 and the filter 70 or be spaced a predetermined distance apart therefrom. Therefore, the filter case 80 and the filter 70 may be prevented from tilting in a direction toward the service door 50 to guide the filter case 80 and the filter 70 to be installed at predetermined positions.

The first mounting groove 56 may be a groove in the vertical direction inside of the door body 52. The first mounting groove 56 may be formed in the vertical direction inside of the door body 52 so as to come in contact with a corner of the fan module 140. Also, the second mounting groove 40 may be a groove in the vertical direction provided inside of the first case body 30 that faces the first mounting groove 56.

The first mounting groove 56 and the second mounting groove 40 may be provided at both sides of the outlet 36 in the width-wise direction W. Therefore, both side corners of the fan module 140 in the width-wise direction W are inserted into the first mounting groove 56 and the second mounting groove 40, and thus, the fan module 140 may be stably mounted.

The second case 60 may be connected to a lower portion of the first case 20 and may be modified in various ways within the technical spirit in which a space, in which electronic components including the battery 220 may be installed, may be formed inside of the second case 60.

A transverse cross-section of at least any of the first case 20 or the second case 60 may be formed in a circular shape or an elliptical shape. Both the first case 20 and the second case 60 may be formed in a cylindrical shape or an elliptical shape, or only the second case 60 may be formed in the cylindrical or elliptical shape. Alternatively, as necessary, only the first case 20 may be formed in the cylindrical or elliptical shape.

In a case in which the second case 60 is formed in the cylindrical or elliptical shape and extends in the vertical direction H, it is convenient for a user to hold an outer periphery of the second case 60 with his or her hand, and the second case 60 may also be easily mounted on a cup holder of a vehicle including a groove having a substantially circular cross-section.

In a case in which the first case 20 is formed in the cylindrical or elliptical shape, friction, which is generated when air moving in the horizontal direction by passing through the inside of the first case 20 comes in contact with the inside of the first case 20 formed in a curved shape, may be reduced such that flow of air is facilitated.

As an air flow path is formed inside of the first case 20 while an air flow path is not formed inside of the second case 60, suction and discharge of air through the first case 20 may be smoothly performed even when the second case 60 is inserted into a cup holder or held by a user's hand. Thus, convenience in use may be improved.

As the second case 60 is mounted on a structure, such as a cup holder having the shape of a groove which is concave toward the lower side, and air may be suctioned through the inlet 32 provided in the first case 20 without interfering with an external structure, air purification performance may be improved.

Further, as the transverse cross-section of the housing 10 is formed in the circular or elliptical shape, the housing 10 may be stably seated on the groove of the cup holder having the circular transverse cross-section, and a separation distance between the housing 10 and the cup holder may be reduced such that vibration and noise may be reduced.

The first case 20 and the second case 60 may be separately formed and then assembled together or may be integrally formed. In this way, various modifications are possible.

Figure 12:
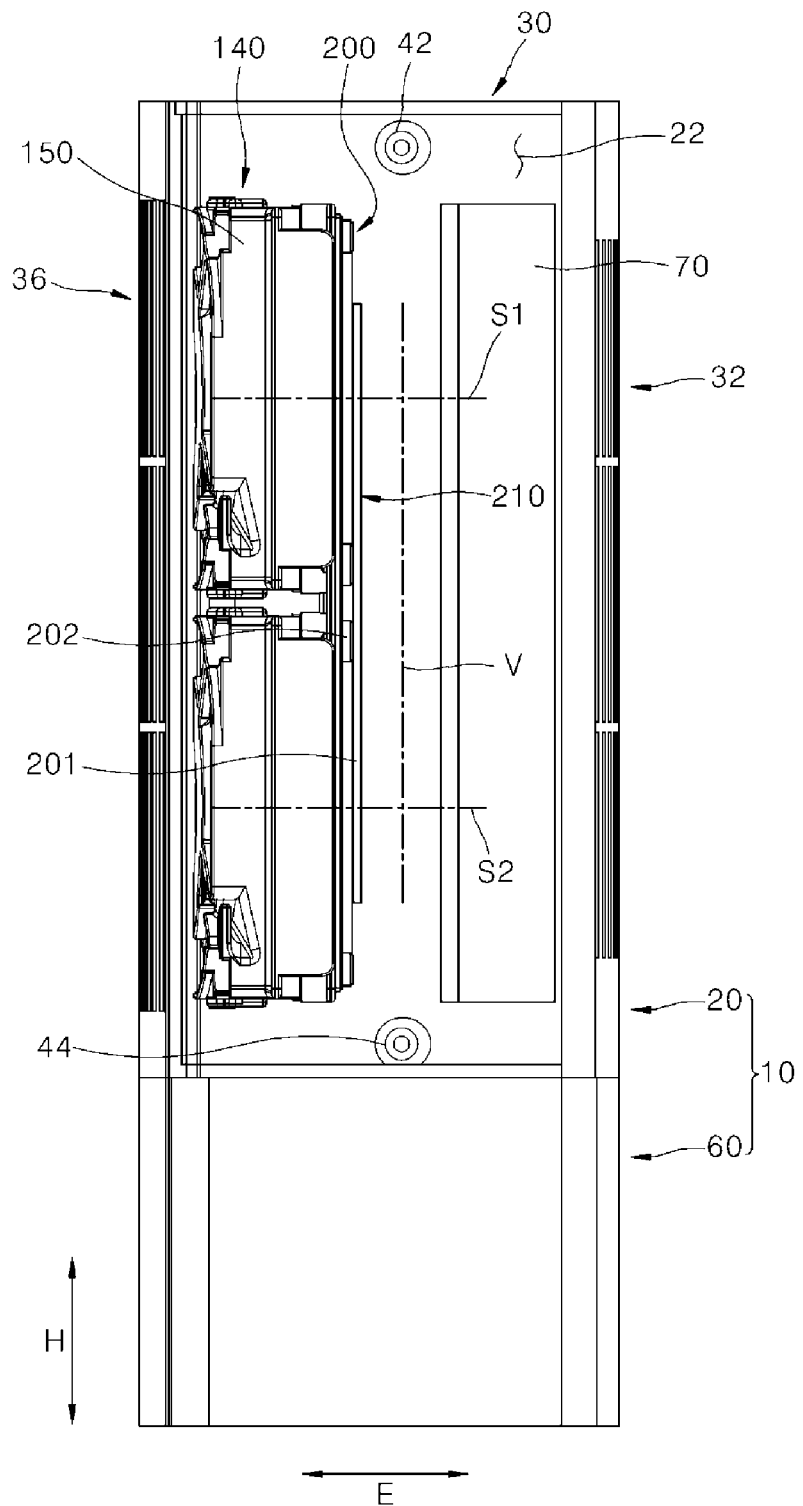
FIG. 12 is a front view illustrating a state in which a sanitizing portion is installed between a fan module and a filter according to an embodiment.
Figure 13:
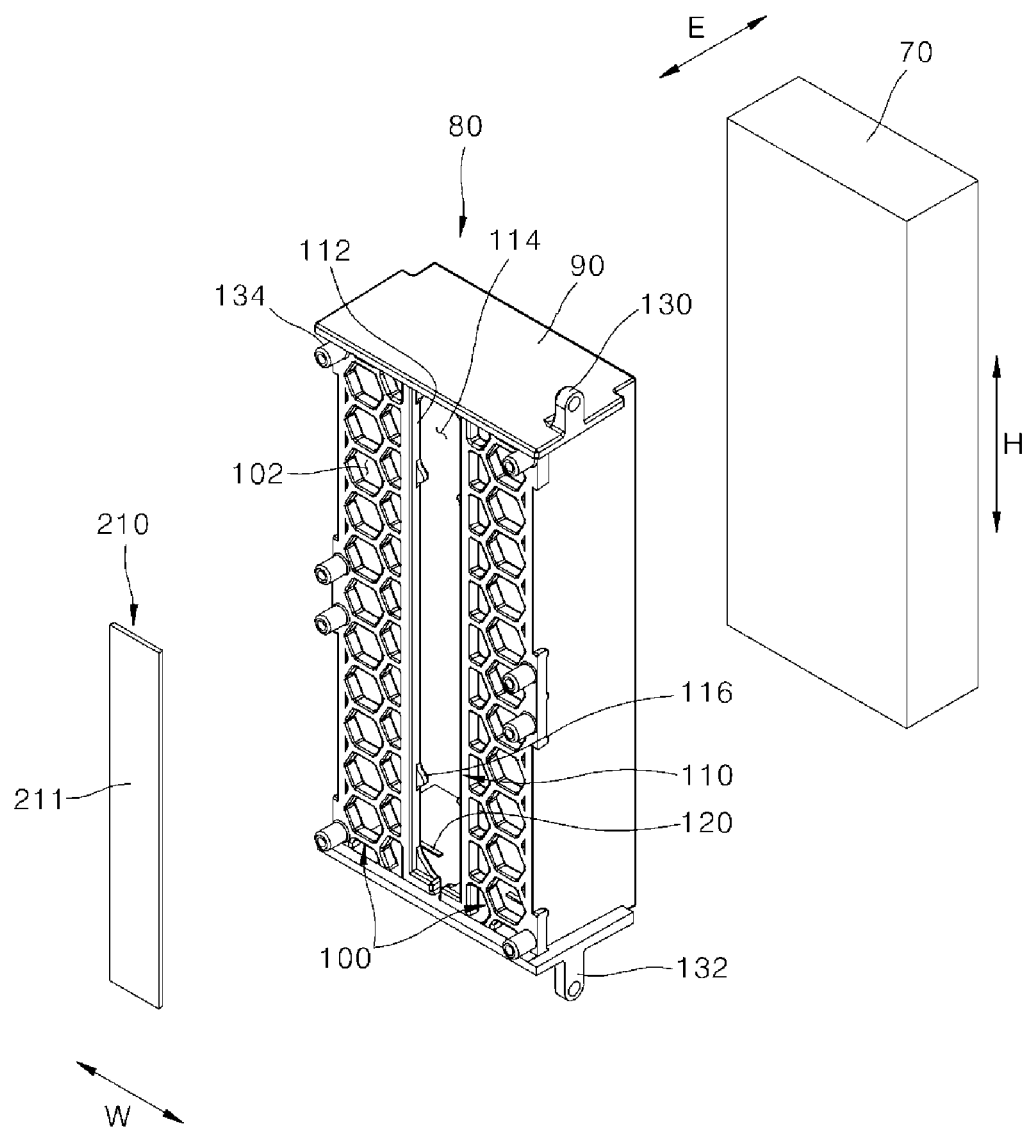
FIGS. 13 and 14 are perspective views illustrating a state in which a filter case is disposed between the sanitizing portion and the filter according to an embodiment.
Figure 14:
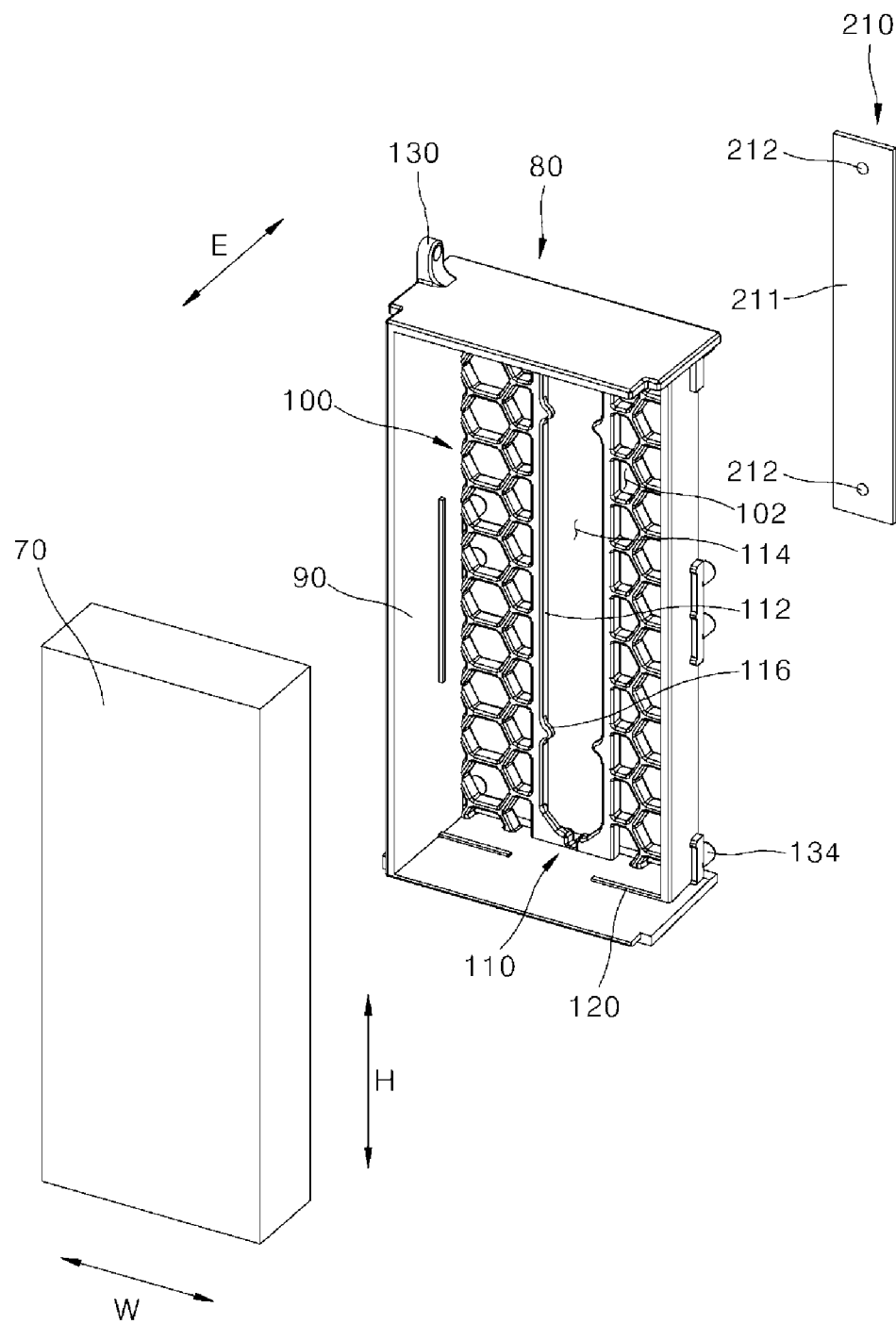

FIG. 12 is a front view illustrating a state in which a sanitizing portion is installed between a fan module and a filter according to an embodiment. and FIGS. 13 and 14 are perspective views illustrating a state in which a filter case is disposed between the sanitizing portion and the filter according to an embodiment.

As illustrated in FIGS. 12 to 14, the filter 70 may be installed inside of the first case 20 and may be modified in various ways within the technical spirit in which the filter 70 purifies air that enters through the inlet 32. The filter 70 according to an embodiment may be formed in a rectangular parallelepiped shape. As the filter 70 is installed inside of the filter case 80 and is easily separated from the filter case 80, the time taken to replace a filter may be reduced.

The filter 70 according to an embodiment may be installed inside of the housing 10 facing the inlet 32. As the filter 70 is disposed inside of the housing 10 and installed in a state in which the filter 70 faces the inlet 32 and both sides of the filter 70 in the width-wise direction W come in contact with the inside of the housing 10, air that enters through the inlet 32 may be guided to move toward the filter 70, and thus, air purification performance may be improved.

Also, as the filter 70 is formed in a rectangular parallelepiped shape that extends in the vertical direction, an area of the filter 70 that comes in contact with air is increased, and thus, air purification performance may be improved. As the filter 70 is mounted inside of the filter case 80 such that movement of the filter 70 is restricted, degradation of air purification performance due to movement of the filter 70 may be prevented.

According to this embodiment, the inlet 32, the filter 70, the fan module 140, and the outlet 36 may be arranged in the first direction, and air flow may also occur in the same direction. That is, the air flow occurring due to operation of the fan module 140 may occur in the same straight direction as the direction in which the inlet 32, the filter 70, the fan module 140, and the outlet 36 are arranged.

When the air flow occurs in the straight direction as described above, resistance to the air flow is lowered correspondingly, and thus, the air flow may occur more smoothly. In this way, as suctioning a sufficient amount of air and discharging a sufficient amount of air, which corresponds to the amount of suctioned air, may be performed by the fan module 140, air purification performance of the portable air purifier 1 may be improved correspondingly.

Figure 15:
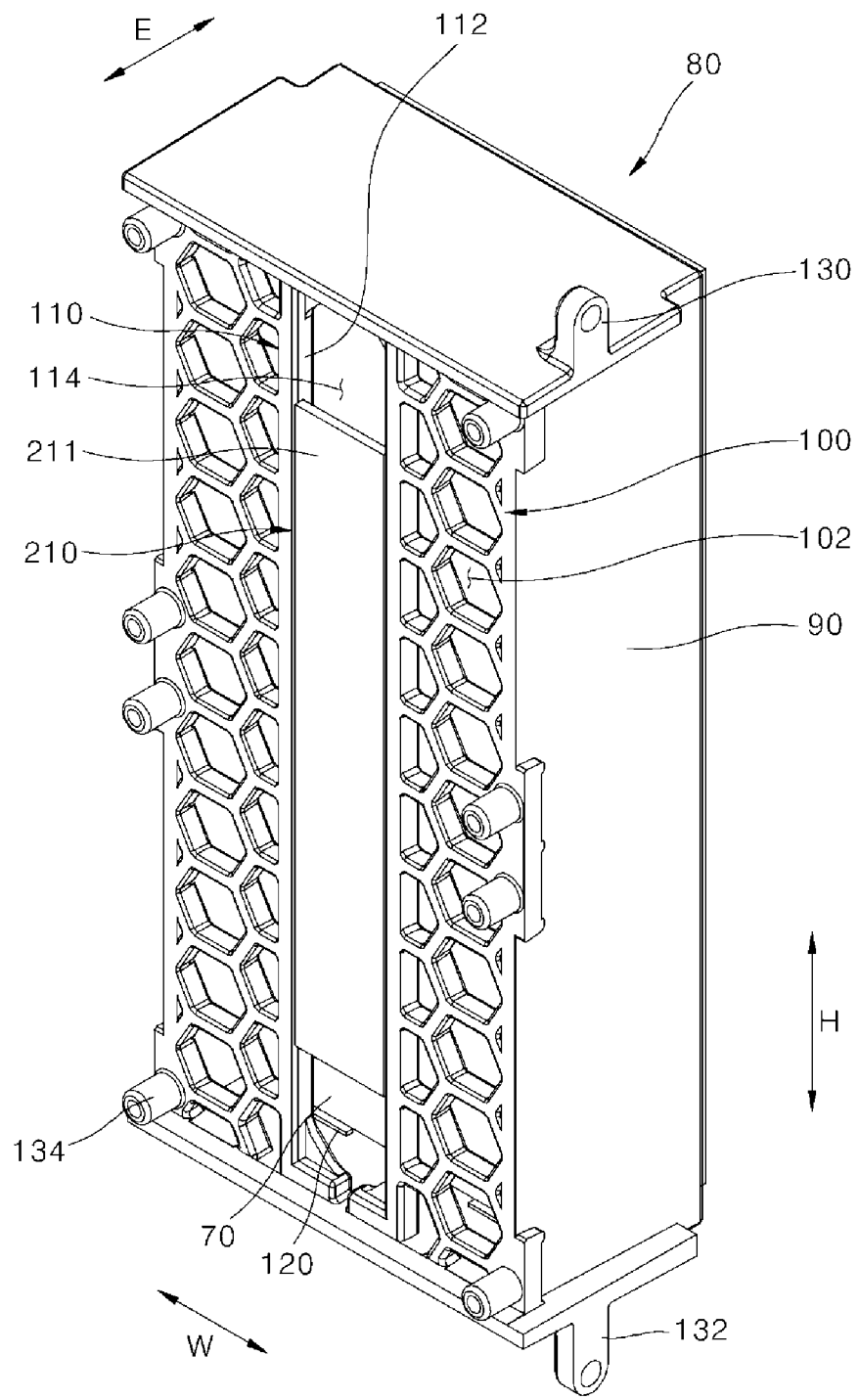
FIG. 15 is a perspective view of the filter case according to an embodiment.

FIG. 15 is a perspective view of the filter case according to an embodiment. As illustrated in FIGS. 13 to 15, the filter case 80 and the filter 70 may be coupled and form a module, and in addition to such a configuration, the sanitizing portion 210 may be coupled to the filter case 80. That is, as the filter case 80, the filter 70, and the sanitizing portion 210 may form a single module, the time and cost for product assembly and maintenance and repair may be reduced.

The filter 70 may be detachably installed in the filter case 80, and the filter case 80 may be disposed between the filter 70 and the fan module 140. The filter case 80 may guide movement of air from the filter 70 to the fan module 140. Further, the filter case 80 may be modified in various ways within the technical spirit in which the filter case 80 fixes the sanitizing portion 210 installed at a position spaced apart from the filter 70. The filter case 80 according to an embodiment may include at least one of case main body 90, flow path guide 100, fixing support 110, a catching step 120, first fixing protrusion 130, second fixing protrusion 132, or first coupling protrusion 134.

The case main body 90 may be fixed to the inside of the housing 10 and may be modified in various ways within the technical spirit in which the filter 70 is mounted inside of the case main body 90. The case main body 90 may form a frame of an exterior of the filter case 80.

In this embodiment, the case main body 90 is illustrated as being formed as a quadrilateral frame both sides of which in the longitudinal direction E are open. An insertion space for accommodating the filter 70 is formed inside of the case main body 90. A rear of the case main body 90 may be open, and in this way, a path for inserting the filter 70 into the insertion space inside of the case main body 90 is formed.

The filter 70 may be mounted in the insertion space inside of the case main body 90. A seating groove or catching step 120 that allows the filter 70 to be firmly mounted inside of the case main body 90 may be provided at an inner side surface of the case main body 90.

Both sides of the case main body 90 in the longitudinal direction E are open, and a length in the longitudinal direction E of a side surface disposed at one or a first side of the case main body 90 in the width-wise direction W that faces the service door 50 is shorter than a length in the longitudinal direction E of a side surface disposed at the other or a second side of the case main body 90 in the width-wise direction W. Therefore, in a case in which the service door 50 is separated from the first case body 30 and then the filter 70 is replaced, as the filter 70 may be easily withdrawn through one side surface of the case main body 90, the time taken to replace the filter 70 may be reduced.

The flow path guide 100 may be installed at one side of the case main body 90 and may be modified in various ways within the technical spirit in which the flow path guide 100 forms a path along which air moves from the filter 70 toward the fan module 140. The flow path guide 100 according to an embodiment may be disposed between the filter 70 and the fan module 140 and form a plurality of through-holes 102.

In a case in which a direction in which the filter 70 is disposed with respect to the filter case 80 is referred to as a "rearward direction" and a direction in which the outlet 36 is disposed with respect to the filter case 80 is referred to as "frontward direction," the flow path guide 100 is connected to the case main body 90 which is disposed at the front of the filter 70. The through-holes 102 pass through in a frontward-rearward direction. The through-holes 102 form a path to allow air that has passed through the filter 70 to move in a direction toward the fan module 140. That is, the plurality of through-holes 102 is provided in the front surface of the filter case 80, and each through-hole 102 passes through in the frontward-rearward direction at the front surface of the filter case 80.

The through-holes 102 may be formed in a hexagonal shape, for example. Also, the plurality of through-holes 102 may be arranged in the shape of a honeycomb, for example, and accordingly, a honeycomb structure may be formed at the front surface of the filter case 80. As the honeycomb structure is formed at the front surface of the filter case 80 as described above, in addition to securing a path for movement of air, rigidity of the filter case 80 may be secured, and weight reduction may be achieved.

The fixing support 110 may be disposed at a center of the flow path guide 100 in the width-wise direction W. Also, the fixing support 110 extends in the vertical direction and may be modified in various ways within the technical spirit in which the fixing support 110 includes a protrusion that supports the sanitizing portion 210. The fixing support 110 according to an embodiment may include a filter frame 112 and a fixing protrusion 116.

The filter frame 112 forms an inner hole 114 that extends in the vertical direction, and both sides of the filter frame 112 in the width-wise direction W may be connected to the flow path guide 100. Both sides of the filter frame 112 in the vertical direction H may be connected to the case main body 90 and form a frame having the shape of a quadrilateral frame extending in the vertical direction. The shape of the inner hole 114 may correspond to the shape of the sanitizing portion 210. Therefore, the sanitizing portion 210 may be easily installed in a state of being inserted into the inner hole 114.

The fixing protrusion 116 may be provided as a plurality of protrusions that protrudes from the filter frame 112 toward the inner hole 114. The fixing protrusion 116 may be modified in various ways within the technical spirit in which the fixing protrusion 116 restricts movement of the sanitizing portion 210 seated in the inner hole 114. The fixing protrusion 116 according to an embodiment may be disposed between the sanitizing portion 210, which is seated in the inner hole 114, and the filter 70 and prevent the sanitizing portion 210 from tilting in a direction toward the filter 70. As the flow path guide 100 is installed at both sides of the fixing support 110, extends in the vertical direction, and includes the plurality of through-holes 102, air that has passed through the filter case 80 may move to the fan module 140.

The catching step 120 may be modified in various ways within the technical spirit in which the catching step 120 protrudes to the inside of the case main body 90 and restricts movement of the filter 70. The catching step 120 according to an embodiment is a band-shaped protrusion that protrudes to the inside of the case main body 90, and an installation position of the catching step 120 is set in consideration of an irradiation angle of the sanitizing portion 210. As the catching step 120 is installed in the shape of a band along an inner periphery of the case main body 90, the filter 70 caught on the catching step 120 may be spaced a predetermined distance apart from the sanitizing portion 210. Therefore, the entire side surface of the filter 70, which faces the sanitizing portion 210, may be irradiated with sanitizing light of the sanitizing portion 210 to improve the effect of sanitizing the filter 70.

The first fixing protrusion 130 may protrude to an upper side of the case main body 90 and be fixed to the first boss 42 provided inside of the housing 10. The second fixing protrusion 132 may protrude to a lower side of the case main body 90 and be fixed to the second boss 44 provided inside of the housing 10. In a state in which the first fixing protrusion 130 faces the first boss 42, movement of the first fixing protrusion 130 may be restricted by fastening the first fixing protrusion 130 with a bolt, for example. Also, in a state in which the second fixing protrusion 132 faces the second boss 44, movement of the second fixing protrusion 132 may be restricted by fastening the second fixing protrusion 132 with a bolt, for example.

As the first coupling protrusion 134, which protrudes in a direction from the case main body 90 toward the fan module 140, is inserted into the fan module 140, coupling between the filter case 80 and the fan module 140 may be easily performed, and as necessary, the filter case 80 and the fan module 140 may form a single module. The first coupling protrusion 134 may be formed in the shape of a circular pipe and extend in the longitudinal direction E from the front of the case main body 90.

Figure 16:
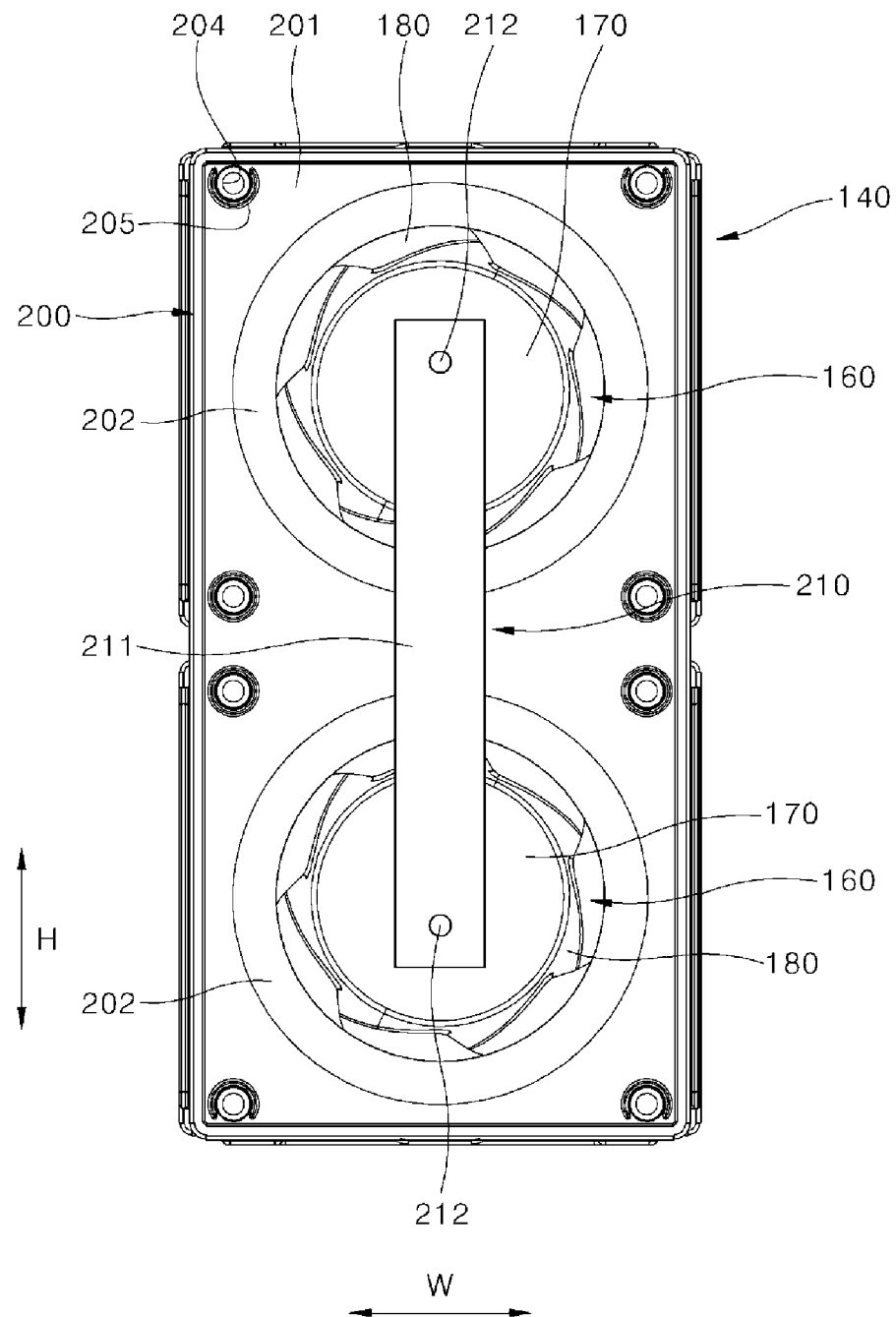
FIG. 16 is a view illustrating a state in which the sanitizing portion is installed at a center of the fan module according to an embodiment.
Figure 17:
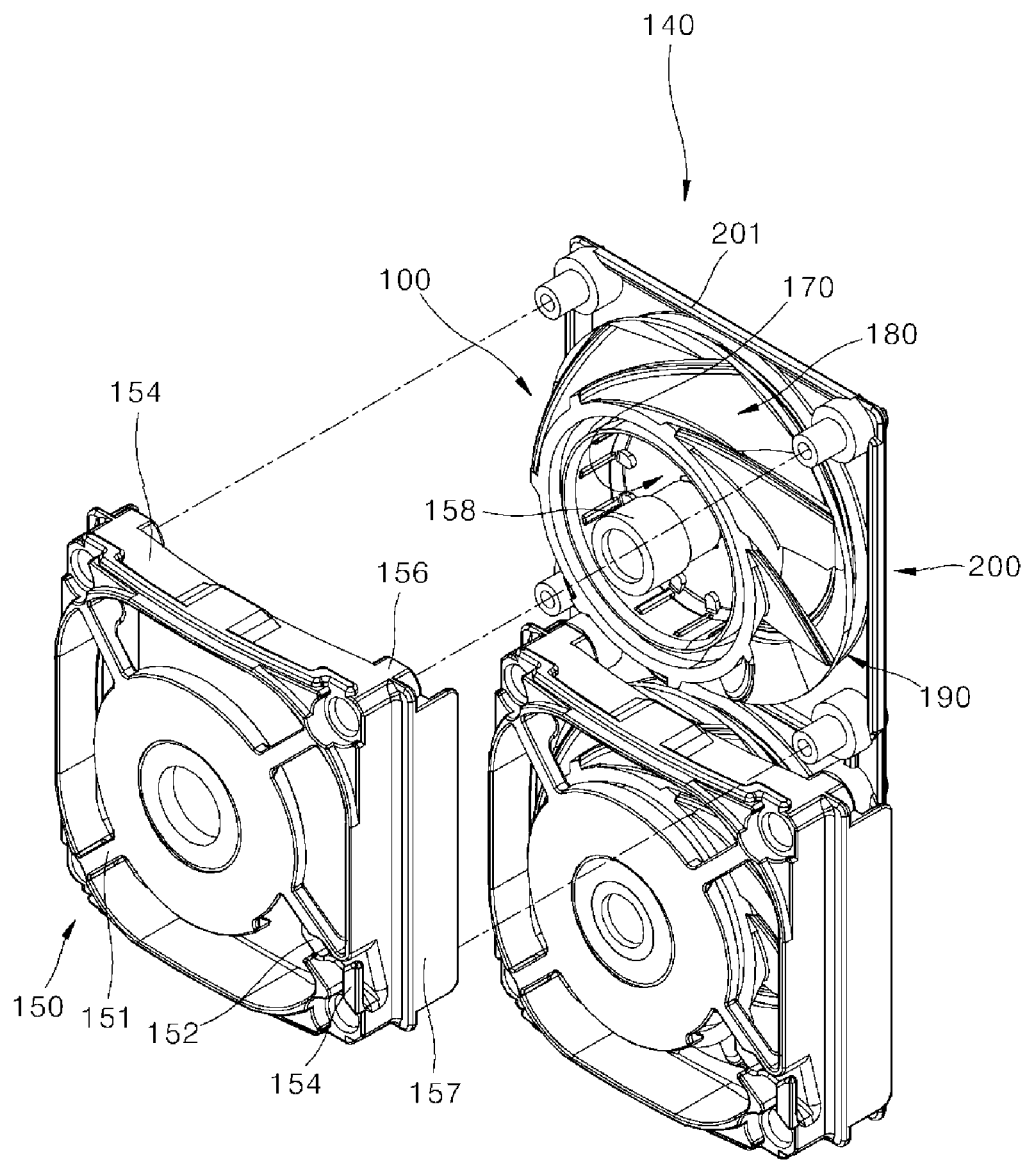
FIG. 17 is a perspective view illustrating a state in which a fan housing is separated from the fan module according to an embodiment.

FIG. 16 is a view illustrating a state in which the sanitizing portion is installed at a center of the fan module according to an embodiment. FIG. 17 is a perspective view illustrating a state in which a fan housing is separated from the fan module according to an embodiment.

As illustrated in FIGS. 12, 16, and 17, the fan module 140 may be installed inside of the housing 10 facing the outlet 36 and may be modified in various ways within the technical spirit in which the fan module 140 suctions air from the rear of the portable air purifier 1 and discharges air to the front. The fan module 140 may be accommodated in the accommodation space 22 of the housing 10 and may be disposed in the first area A. In the fan module 140, two fan housings 150 and two fans 160 may form modules each including a single fan housing 150 and a single fan 160, and the modules may be arranged in the vertical direction.

The fan module 140 may be disposed between the outlet 36 and the filter case 80, and more specifically, between the outlet 36 and the sanitizing portion 210. Therefore, the fan module 140 may serve to blow air and restrict movement of the sanitizing portion 210 together with the filter case 80.

A length of the fan module 140 in the width-wise direction W may longer than a length of a discharge in the width-wise direction W. Therefore, the fan module 140 may be fixed inside of the first case 20 disposed at both sides of the discharge in the width-wise direction W, and air discharged from the fan module 140 toward the front may be moved along an inner curved surface of the first case 20, which is disposed between the fan module 140 and the discharge, and then may be discharged to the front of the portable air purifier 1 through the discharge. That is, as the inner curved surface of the first case 20 disposed between the fan module 140 and the discharge serves as an air guide that guides movement of air toward the outlet 36, the ability of the fan module 140 to blow air in a straight line may be improved.

As both front corners of the fan module 140 are inserted into the first mounting groove 56 and the second mounting groove 40 which are provided inside of the housing 10, and thus, movement of the fan module 140 is restricted, a size of the first case 20 is not necessarily enlarged due to fixing or fastening the fan module 140. In this way, reduction of product size is possible. Also, for use in a vehicle, the portable air purifier 1 may be implemented to have a size that allows the portable air purifier 1 to be inserted into a cup holder.

The fan 160 may rotate due to operation of a motor. Only a rotational shaft of the motor that rotates the fan 160 may be connected to the fan 160, a rotor may be installed at the fan 160, and a stator may be installed in the fan housing 150. As a magnetic field of the stator changes, the shaft that rotates along with the rotor may be connected to the fan 160, and the rotor and the fan 160 may be rotated by the stator. As the configuration of the motor rotating the fan 160 is known, detailed description thereof has been omitted.

The fan module 140 according to an embodiment may include the fan housing 150, the fan 160, and a fan base 200.

Figure 18:
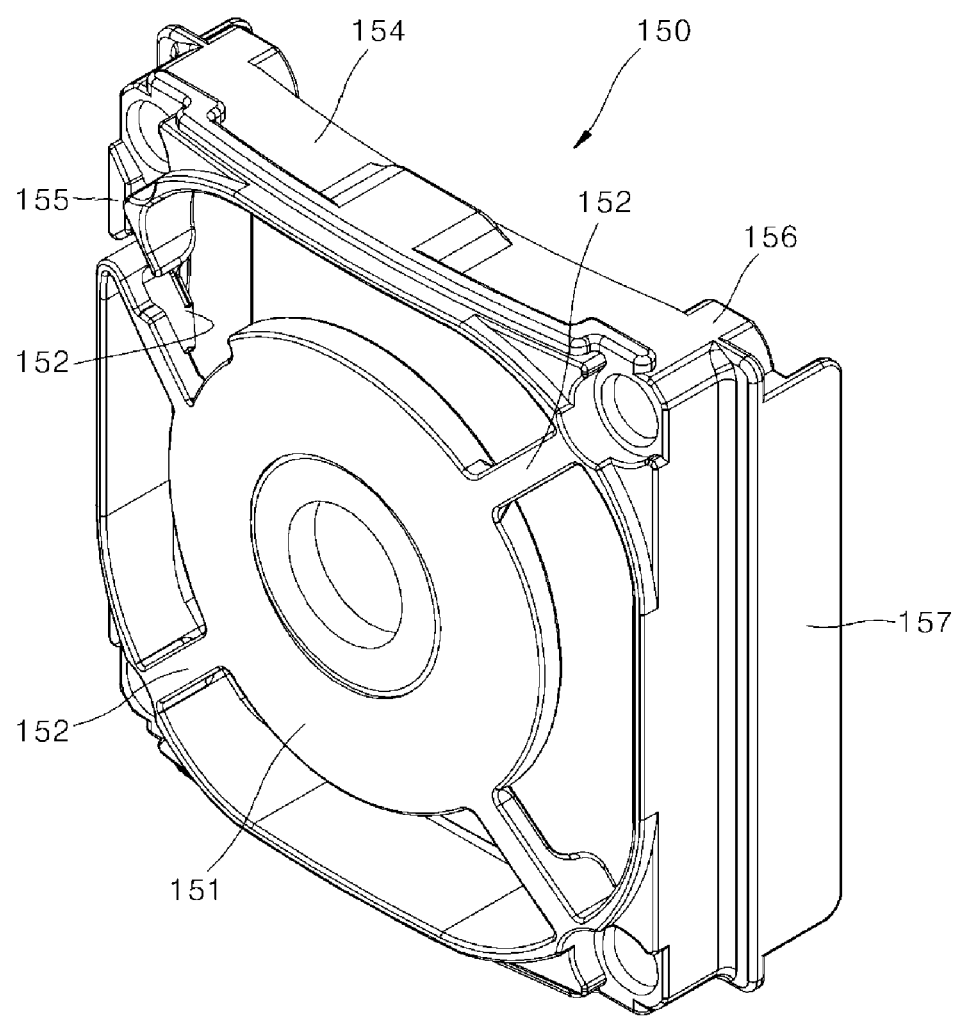
FIG. 18 is a perspective view of the fan housing according to an embodiment.
Figure 19:
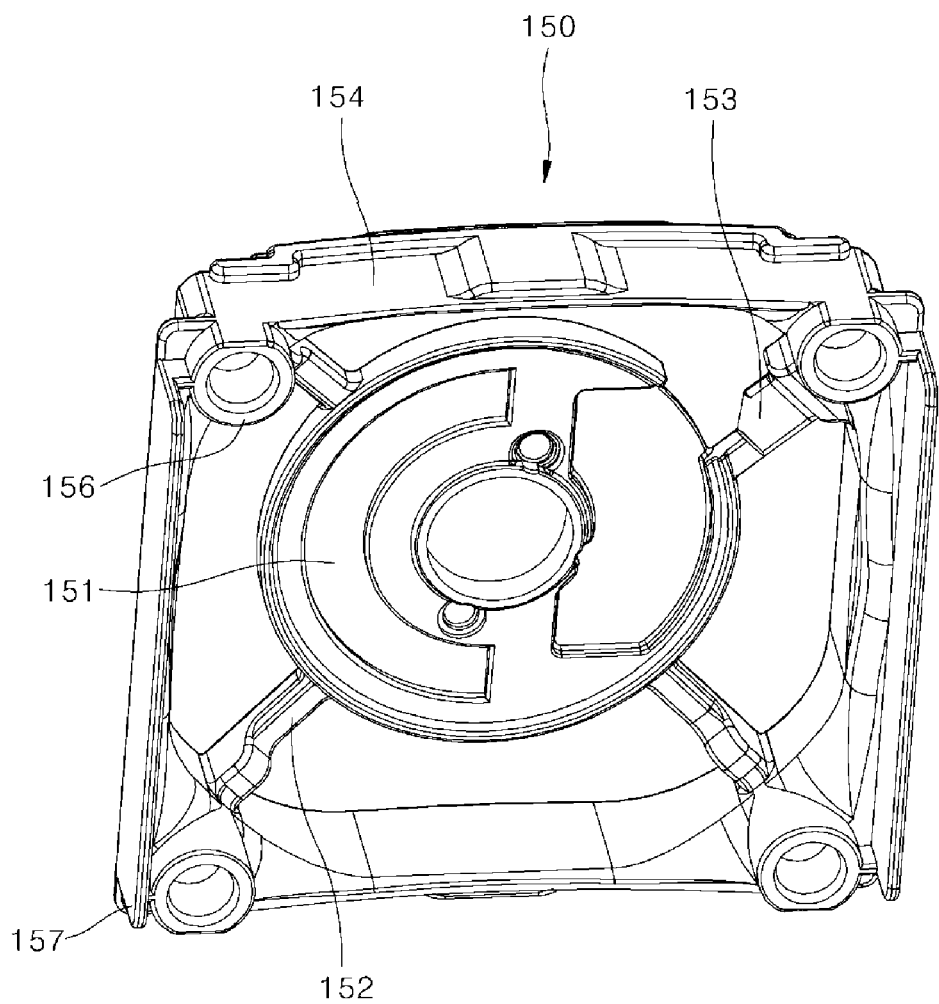
FIG. 19 is a perspective view illustrating an inside of the fan housing according to an embodiment.

FIG. 18 is a perspective view of a fan housing according to an embodiment. FIG. 19 is a perspective view illustrating the inside of the fan housing according to an embodiment.

As illustrated in FIGS. 17 to 19, the fan housing 150 may be fixed to the inside of the housing 10 and may be modified in various ways within the technical spirit in which the fan housing 150 has a space formed therein to allow rotation of the fan 160. The fan housing 150 may surround the fan 160 and be coupled to the fan base 200. As the fan housing 150, the fan 160, and the fan base 200 may form a module, product assembly and maintenance and repair may be performed conveniently.

The fan housing 150 according to an embodiment may include at least one of a support plate 151, a connection support 152, a wire guide 153, a side support 154, a wire fixing protrusion 155, a protruding boss 156, a side blade 157, or a central guide 158. The support plate 151 may be in the shape of a plate installed at a position facing the fan 160, and a hole may be formed at a center of the support plate 151. A motor may be installed at the center of the support plate 151, or a shaft connected to the motor may be installed in the first direction. The support plate 151 may be disposed at a rear of the outlet 36.

The connection support 152 may extend radially outward from the support plate 151 and be connected to the side support 154. The connection support 152 according to an embodiment may be provided as a plurality of connection supports 152 and may be in the shape of a rod. The connection supports 152 extending radially outward from the support plate 151 may be connected to the side support 154 having the shape of a frame.

The wire guide 153 may be installed on the connection support 152 and support a wire installed along the side surface of the connection support 152. The wire guide 153 may be in the shape of a protrusion, which is disposed at a rear of a side surface of the connection support 152, and guide a wire of the motor installed on the support plate 151 outside of the fan housing 150. The wire guide 153 may be provided at the side surface of the connection support 152 and be in the form of a concave groove to allow the wire to be disposed therein. Therefore, as the wire installed in the wire guide 153 is disposed in the concave groove disposed at the side surface of the connection support 152, and the wire is supported by the wire guide 153, damage to the wire may be prevented.

The side support 154 may be modified in various ways within the technical spirit in which the side support 154 forms a circular or quadrilateral frame along a periphery of the support plate 151. The side support 154 according to an embodiment may be in the shape of a quadrilateral frame both sides of which in the first direction are open. An outer side of the side support 154 may come into contact with the inside of the first case 20, and an inner side of the side support 154 may be connected to the connection support 152.

The protruding boss 156 may extend to a rear of the side support 154 toward the fan base 200 and may be modified in various ways within the technical spirit in which the protruding boss 156 includes a groove configured to be coupled to a coupling protrusion 204 of the fan base 200, which will be described hereinafter, inserted thereinto. A plurality of the protruding boss 156 according to an embodiment may be provided along a periphery of the side support 154.

The wire fixing protrusion 155 may protrude from the side support 154 and may be modified in various ways within the technical spirit in which the wire fixing protrusion 155 is disposed in a lateral direction of a wire, which is disposed outside the connection support 152, to restrict detachment of the wire. The wire fixing protrusion 155 according to an embodiment may be disposed at the front of a wire, which is guided to a corner of the fan housing 150 along the connection support 152, and may restrict the wire from protruding to the front of the fan housing 150 to prevent damage to the wire.

The side blade 157 may be provided at both sides of the side support 154 in the width-wise direction W and be in the shape of a plate extending in the first direction. The side blade 157 may extend in the vertical direction H and extend to the rear of the side support 154. The side blade 157 may serve as an air guide that allows air moved by the fan 160 to move in a direction toward the outlet 36 and serves to prevent the fan 160 rotating at a high speed from colliding with another object.

The central guide 158 may be in the shape of a circular pipe and be fixed to the support plate 151. A hole formed inside of the central guide 158 may extend in the first direction. As the shaft connected to the fan 160 is disposed at an inner side of the central guide 158, the central guide 158 may serve to guide stable rotation of the shaft.

Figure 20:
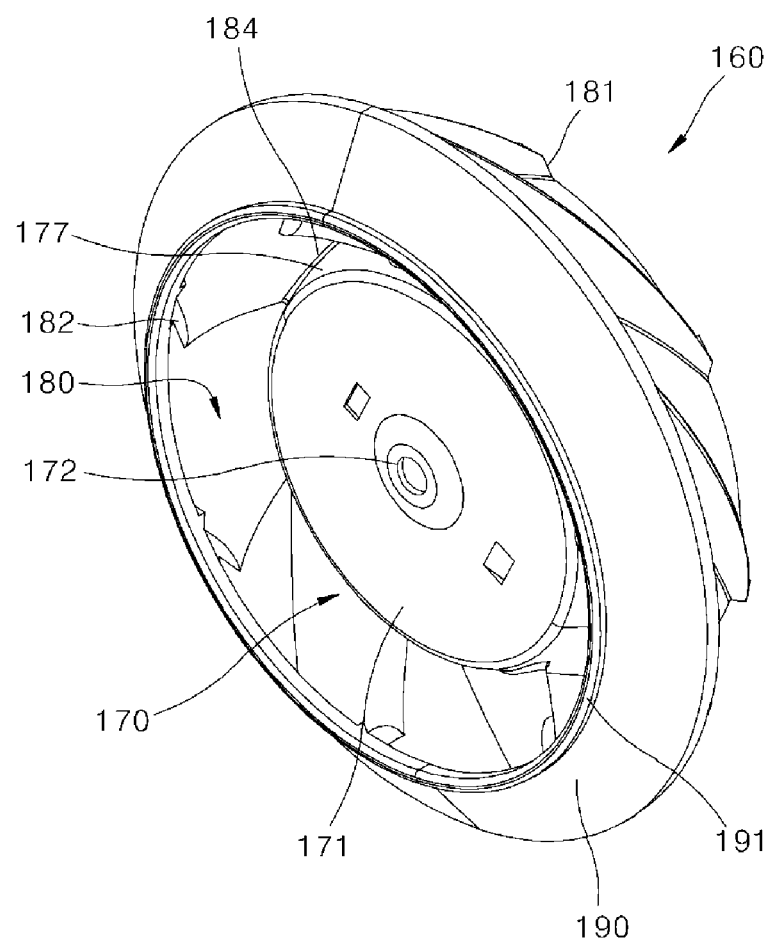
FIG. 20 is a perspective view of a shroud of a fan according to an embodiment.
Figure 21:
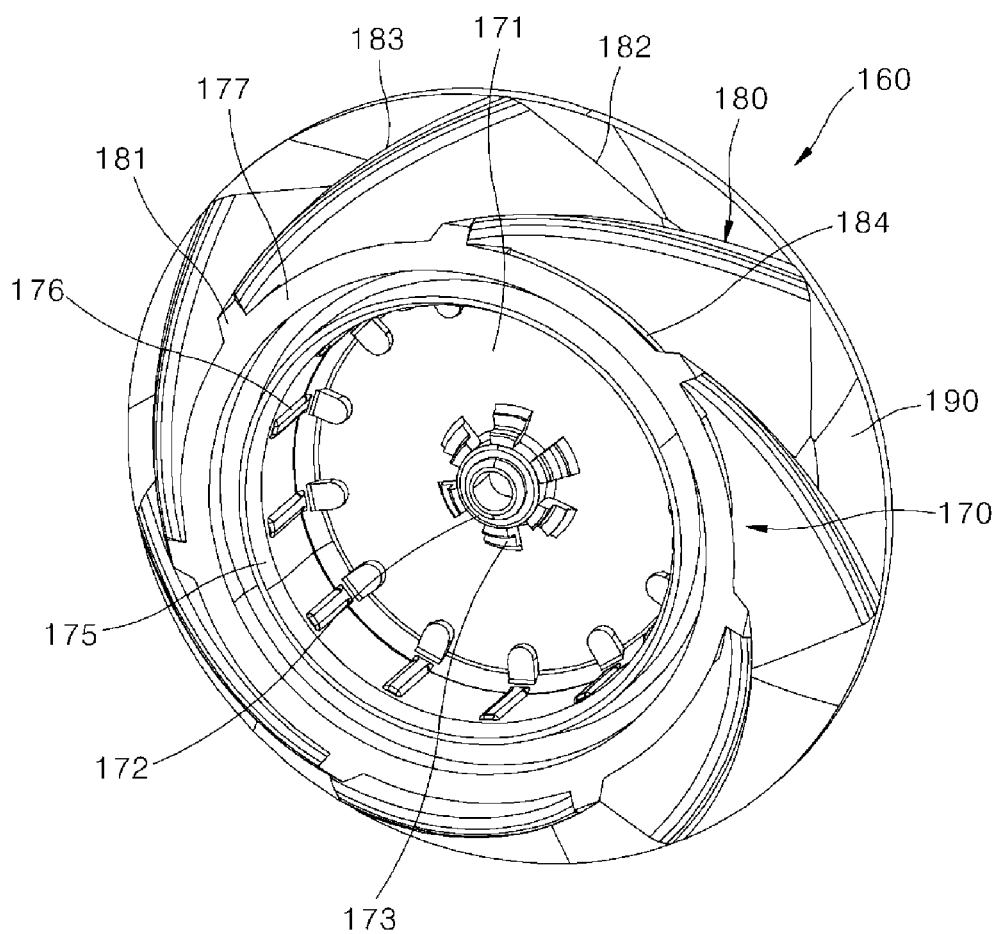
FIG. 21 is a perspective view of an axial coupling portion of the fan according to an embodiment.
Figure 22:
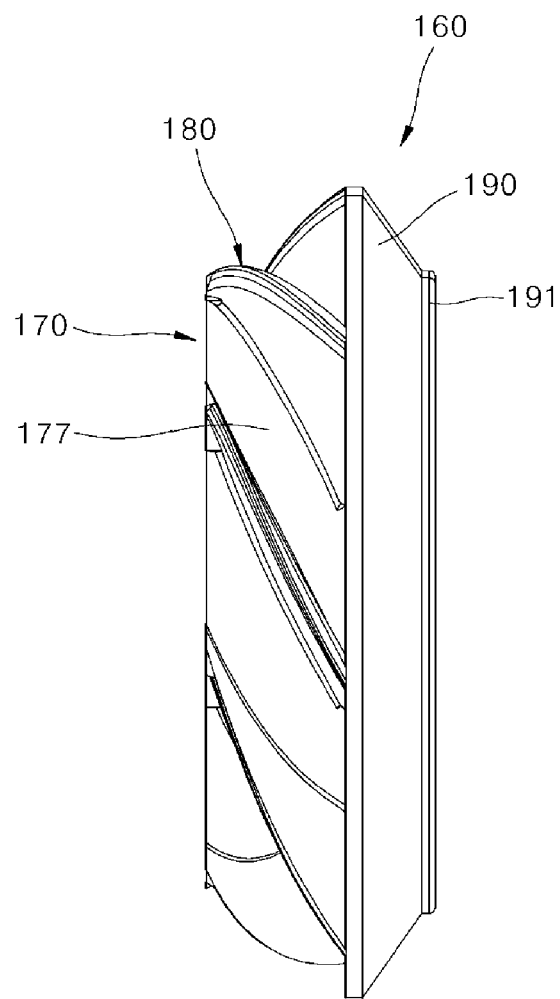
FIG. 22 is a front view of the fan according to an embodiment.
Figure 23:
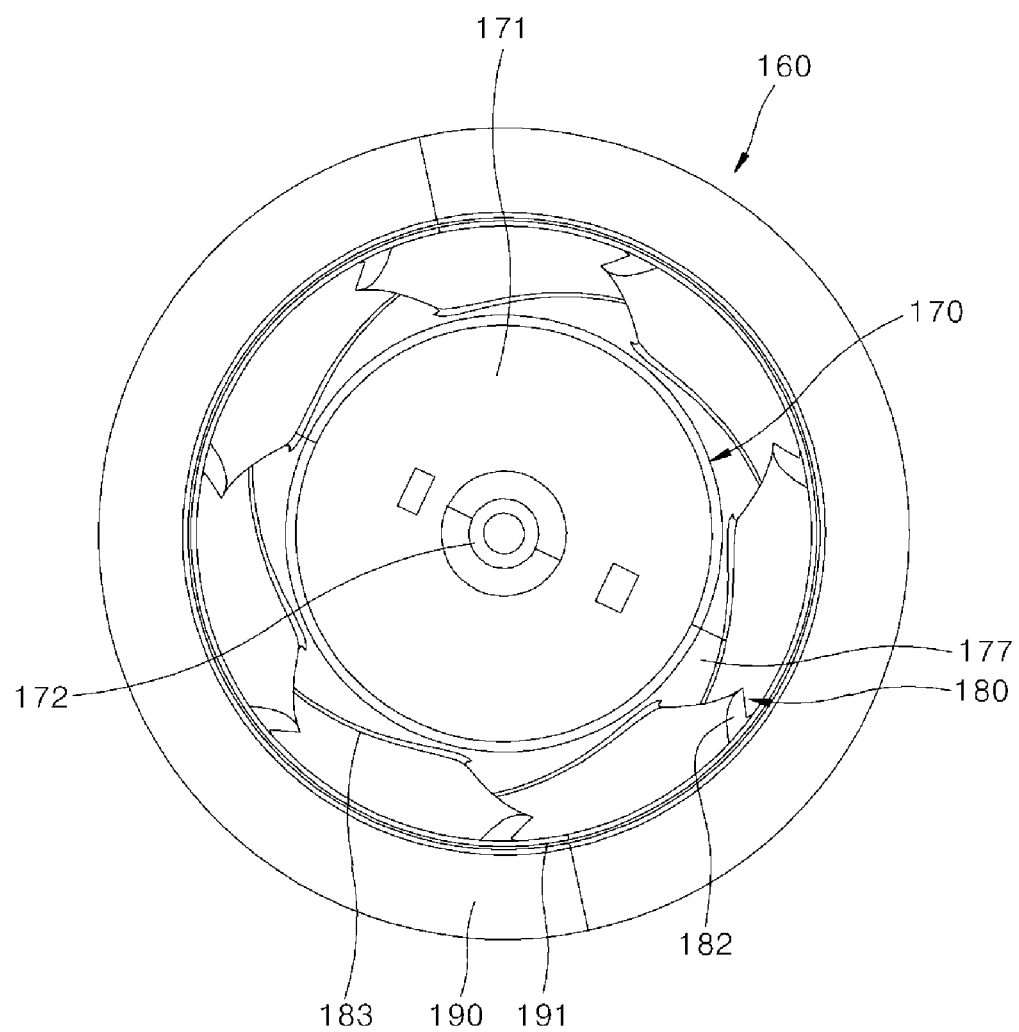
FIG. 23 is a view illustrating a hub of the fan according to an embodiment.
Figure 24:
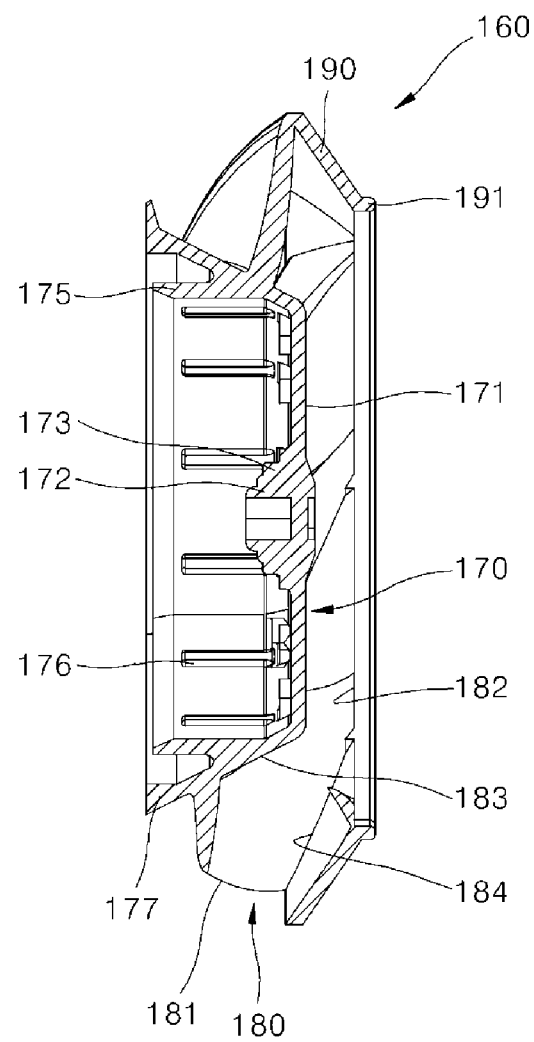
FIG. 24 is a cross-sectional view of the fan according to an embodiment.

FIG. 20 is a perspective view of a shroud of the fan according to an embodiment. FIG. 21 is a perspective view of an axial coupling portion of the fan according to an embodiment. FIG. 22 is a front view of the fan according to an embodiment. FIG. 23 is a view of a hub of the fan according to an embodiment. FIG. 24 is a cross-sectional view of the fan according to an embodiment.

As illustrated in FIGS. 20 to 24, the fan 160 may be rotatably installed inside of the fan housing 150 and may be modified in various ways within the technical spirit in which the fan 160 is able to move air in the direction toward the outlet 36. A diagonal flow fan may be used as the fan 160; however, embodiments are not limited thereto, and other types of fans may also be used as the fan 160. The fan 160 according to an embodiment may include at least one of the hub 170, fan blade 180, or the shroud 190.

The hub 170 may be disposed at a center of the fan housing 150 and may be modified in various ways within the technical spirit in which the hub 170 receives external power and rotates. The hub 170 may be disposed at a center of the fan 160 in the radial direction and may rotate along with the rotor and the shaft, which is an output shaft of the motor. The hub 170 according to an embodiment may include at least any of hub plate 171, axial coupling portion 172, inner side protruding portion 175, or skirt 177.

The hub plate 171 may be formed in the shape of a disk that is parallel to the support plate 151. The axial coupling portion 172 may be provided on the hub plate 171. The axial coupling portion 172 may be disposed at a center of the hub plate 171 in the radial direction. The axial coupling portion 172 may protrude from the hub plate 171 in the first direction.

The axial coupling portion 172 may be coupled to an end portion of a shaft that transmits rotary power. For example, the shaft may be fitted and fixed to the axial coupling portion 172.

First reinforcing protrusions 173 may be provided at predetermined intervals along an outer periphery of the axial coupling portion 172. The first reinforcing protrusions 173 may be radially installed about a center of the axial coupling portion 172 and be formed as band-shaped protrusions at an outer side of the axial coupling portion 172. Therefore, as stress concentrated on the axial coupling portion 172 is distributed through the first reinforcing protrusions 173, structural rigidity of the axial coupling portion 172 may be improved.

The inner side protruding portion 175 may protrude in a direction from the hub plate 171 toward where the support plate 151 is installed. The inner side protruding portion 175 according to an embodiment may have an arc shape along the outer side edge of the hub plate 171. The inner side protruding portion 175 may be formed in the shape of a pipe that extends in the first direction.

Second reinforcing protrusions 176 may be provided at predetermined intervals along an inner periphery of the inner side protruding portion 175. The second reinforcing protrusions 176 may be installed in the first direction along an inner side surface of the inner side protruding portion 175, and the second reinforcing protrusions 176 may be band-shaped protrusions that extend toward the axial coupling portion 172. Therefore, as stress concentrated on the inner side protruding portion 175 may be distributed through the second reinforcing protrusions 176, structural rigidity of the inner side protruding portion 175 may be improved. As necessary, the rotor of the motor may be fixed to the inner side of the inner side protruding portion 175.

The skirt 177 may protrude in a direction from an edge of the hub plate 171 toward the support plate 151. The skirt 177 may form an inclined surface that is inclined radially outward away from the hub plate 171 in the first direction. The skirt 177 may be disposed at an outer side of the inner side protruding portion 175, and an inner diameter of the skirt 177 may gradually increase in a direction toward the front of the hub plate 171.

For example, the hub plate 171 and the skirt 177 may be connected in the shape of a truncated cone in which a hole is formed and one side of which is open. The skirt 177 may be in the shape of a funnel in which the front is open and the rear is blocked by the hub plate 171.

The shroud 190 may be connected to an end portion of the fan blade 180 and have in an annular shape and may be modified in various ways within the technical spirit in which the shroud 190 is spaced apart from the fan base 200. The shroud 190 may be installed along an outer periphery of the skirt 177, and the shroud 190 and the skirt 177 may be connected by the fan blade 180. Also, an outer diameter of the hub 170 and an inner diameter of the shroud 190 may gradually decrease in a direction from the outlet 36 toward the inlet 32.

The shroud 190 may be spaced a predetermined distance apart from the hub 170 in the radial direction of the fan module 140 and may be disposed at an outer side of the hub 170 in the radial direction. Also, the shroud 190 may be spaced apart from the hub 170 as much as a distance that corresponds to a length of the fan blade 180 in the radial direction. Each fan blade 180 may connect the skirt 177, which is disposed at the hub 170, and the shroud 190.

The shroud 190 may form an inclined surface that is substantially parallel to the skirt 177. In this embodiment, the skirt 177 and the shroud 190 are arranged in a form in which a distance between the skirt 177 and the shroud 190 gradually increases in a direction toward the front of the shroud 190. The front refers to in a direction from a center of the housing 10 toward the outlet 36, and the rear refers to in a direction from the center of the housing 10 toward the inlet 32.

An inlet protrusion 191 provided at the rear of the shroud 190 may be a ring-shaped protrusion and extend in the first direction from the funnel-shaped shroud 190. As the inlet protrusion 191 is disposed at an inner side of bell mouth 202, which will be described hereinafter, the inlet protrusion 191 may prevent returning flow of air that enters through an inlet provided in the shroud 190 along an outer side of the shroud 190.

A plurality of the fan blade 180 may be provided, and the plurality of fan blades 180 may be spaced apart from each other at equal intervals along an outer peripheral surface of the hub 170. The fan blades 180 may protrude to the outside of the hub 170 with respect to the center of the hub 170 and extend in a spiral shape. Also, the plurality of fan blades 180 may be spaced apart from each other at predetermined intervals in a peripheral direction of the hub 170.

The fan blades 180 according to an embodiment may protrude to the outside of the skirt 177 in a centrifugal direction extending in a spiral shape from the center of the axial coupling portion 172. When a direction from the outside of the axial coupling portion 172 toward the axial coupling portion 172 is the radial direction, an inner side of the fan blades 180 in the radial direction may be connected to the skirt 177, and an outer side of the fan blades 180 in the radial direction may be connected to the shroud 190, which will be described hereinafter.

The skirt 177 is a portion of the hub 170 that is directly connected to the fan blades 180 and that also comes in direct contact with air passing through the fan blades 180. The skirt 177 is also closely related to a flow path of air passing through the fan module 140.

Each fan blade 180 that connects the shroud 190 and the skirt 177 may include a first end portion 181, a second end portion 182, a first edge 183, and a second edge 184. The first end portion 181 may be disposed at a front end of the fan blade 180 in a rotational direction thereof and may be formed in a linear shape that extends in the radial direction. The rotational direction may be defined as a direction in which rotation of the fan 160 occurs. The second end portion 182 may be disposed at a rear end of the fan blade 180 in the rotational direction thereof and may be radially formed about the axial coupling portion 172.

The first edge 183 may connect one or a first end of the first end portion 181 and one or a first end of the second end portion 182. The first edge 183 may be connected to an inner peripheral surface of the shroud 190.

The second edge 184 may connect the other or a second end of the first end portion 181 and the other or a second end of the second end portion 182. The second edge 184 may be connected to the outer peripheral surface of the hub 170.

That is, the first end of the first end portion 181 and the first end of the second end portion 182 may be connected to the inner peripheral surface of the shroud 190. Also, the second end of the first end portion 181 and the second end of the second end portion 182 may be connected to an outer peripheral surface of the skirt 177.

The first end of the first end portion 181 may be disposed closer to the center of the hub plate 171 in the radial direction than the first end of the second end portion 182. Also, the second end of the second end portion 182 may be disposed closer to the center of the hub plate 171 in the radial direction than the second end of the first end portion 181. This is because the first end and the second end of the first end portion 181 are disposed more toward the front in the rotational direction than the first end and the second end of the second end portion 182, and the skirt 177 is formed such that a radius thereof gradually decreases toward the front in the rotational direction.

According to this embodiment, the fan blade 180 may be connected to the skirt 177 of the hub 170. In order to guide a flow of air entering the fan module 140 in a direction which is inclined upward, the skirt 177 forms an inclined surface which is inclined upward.

Figure 25:
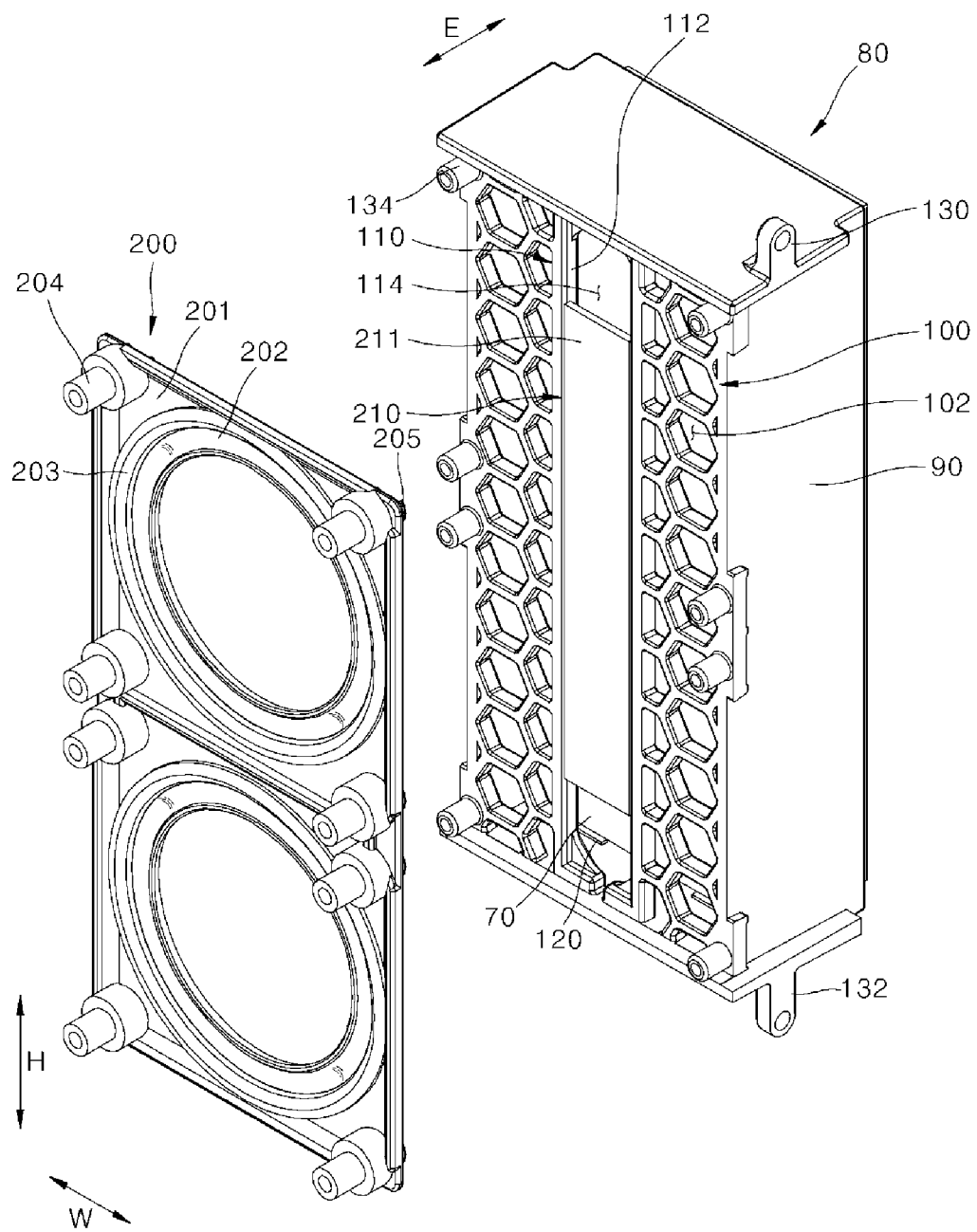
FIG. 25 is a perspective view illustrating a state in which a fan base is separated from the filter case according to an embodiment.
Figure 26:
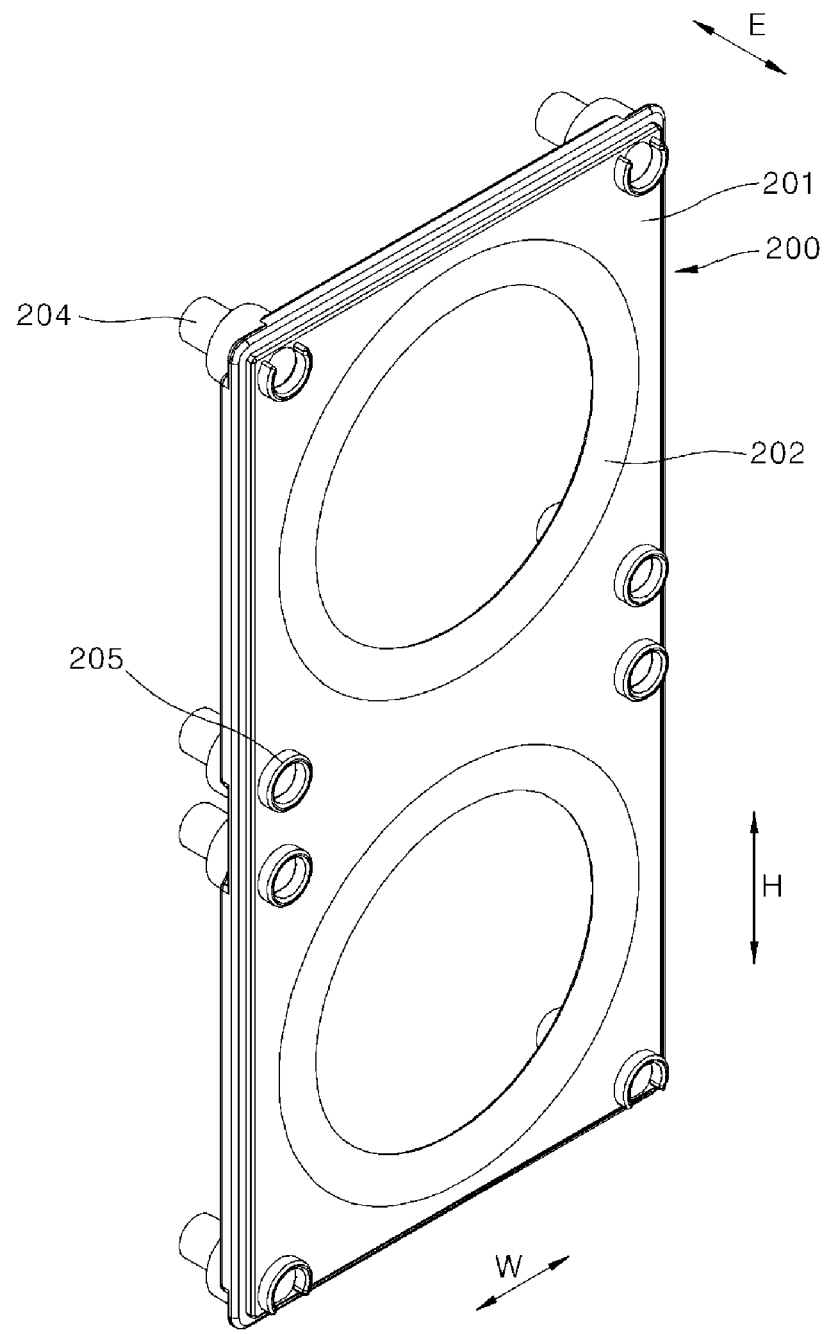
FIG. 26 is a perspective view of the fan base according to an embodiment.
Figure 27:
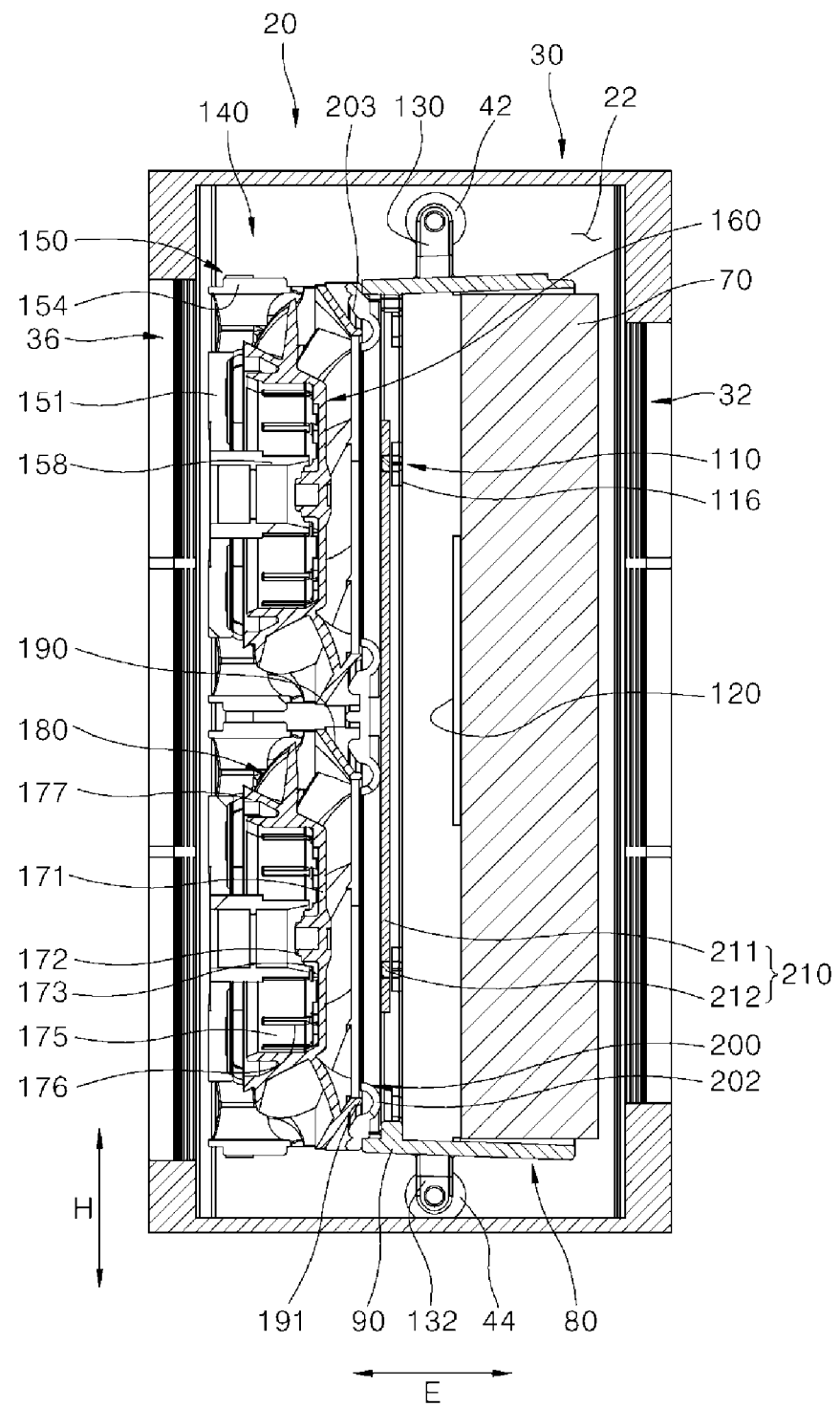
FIG. 27 is a view illustrating a state in which the sanitizing portion is installed in a state of being spaced apart from the filter according to an embodiment.

FIG. 25 is a perspective view illustrating a state in which the fan base is separated from the filter case according to an embodiment. FIG. 26 is a perspective view of the fan base according to an embodiment. FIG. 27 is a view illustrating a state in which the sanitizing portion is installed in a state of being spaced apart from the filter according to an embodiment.

As illustrated in FIGS. 25 to 27, the fan base 200 may be coupled to the rear of the fan housing 150 and may be modified in various ways within the technical spirit in which the fan base 200 guides air, which has passed through the filter 70, to enter the fan 160. The fan base 200 may be disposed between the filter 70 and the fan 160. The front of the fan base 200 may be coupled to the fan housing 150, and the rear of the fan base 200 may be coupled to the filter case 80. Also, the fan base 200 may support a front of the sanitizing portion 210, and the filter case 80 may support a rear of the sanitizing portion 210. Also, a movement path of air being suctioned into the fan 160 may be formed in the fan base 200, and as many air movement paths as the number of fans 160 may be formed.

The fan base 200 may have a substantially plate-like shape, and an outer shape of the fan base 200 may correspond to a shape of the fan housing 150. For example, in a case in which the fan housing 150 has a quadrilateral shape and is installed in the vertical direction, the fan base 200 coupled to the fan housing 150 may also be formed in the shape of a rectangular plate that extends in the vertical direction. The fan base 200 according to an embodiment may include at least one of base plate 201, bell mouth 202, coupling protrusion 204, or protruding rib 203.

The base plate 201 may be disposed between the filter case 80 and the fan 160. The base plate 201 may be in the shape of a rectangular plate that extends in the vertical direction H and having a hole formed at a center to allow movement of air. The plurality of the hole may be provided, and the plurality of holes may be arranged in the vertical direction H.

The bell mouth 202 may be in an annular shape installed at an inner side of the base plate 201 that faces the holes. The bell mouth 202 may extend in the circumferential direction and have a longitudinal end surface formed in a concave shape that surrounds an end portion of the inlet protrusion 191 of the shroud 190.

The bell mouth 202 may be formed in a shape that surrounds an outer peripheral surface of the holes formed at the center of the base plate 201. The bell mouth 202 may be convex toward the rear and may form a groove which is concave toward the front.

At least a portion of the bell mouth 202 may be inserted into the shroud 190 in the radial direction. The bell mouth 202 may guide a suctioning flow at the inlet of the fan module 140 to contribute to an improvement in suctioning and discharging performance of the fan module 140. Also, as the rear of the bell mouth 202 is formed as a convex curved surface, an increase in frictional resistance of air moving forward through the bell mouth 202 may be decreased, and thus, air blowing may be facilitated.

Also, the coupling protrusion 204 protrudes to the front from the base plate 201 in the first direction and is coupled to the groove of the protruding boss 156, which is disposed in the fan housing 150, by being fitted thereto to fix the fan base 200 to the fan housing 150. The fan base 200 and the fan housing 150 may be coupled at a plurality of points due to coupling performed between the coupling protrusion 204 and the protruding boss 156. When coupling between the fan base 200 and the fan housing 150 is performed as described above, the fan 160 may be rotatably installed between the fan base 200 and the fan housing 150.

The protruding rib 203 may have an annular shape and surround an outer periphery of the bell mouth 202 and may be installed to be parallel to an outer side of the fan 160. The protruding rib 203 may protrude from the base plate 201 and may be disposed at the outer side of the bell mouth 202 in the radial direction.

The protruding rib 203 may be integrally formed with the base plate 201. More specifically, the base plate 201, the bell mouth 202, and the protruding rib 203 may be integrally formed.

The protruding rib 203 may be inclined at a same angle as an outer side surface of the shroud 190, and a distance between the protruding rib 203 and the shroud 190 may be maintained constant. The protruding rib 203 may protrude in a shape forming an inclined surface. The inclined surface of the protruding rib 203 may be formed as an inclined surface which is spaced a predetermined distance apart from the shroud 190 and is parallel to the inclined surface of the shroud 190.

The inclined surface of the protruding rib 203 may have the same angle of inclination as an inclined surface of an inner side guide disposed in the fan housing 150. Therefore, it is possible to prevent a return air phenomenon in which a portion of air, which has moved to the front through a space between the shroud 190 and the skirt 177, moves to the inlet of the fan 160 through a space between the shroud 190 and the protruding rib 203. Therefore, an occurrence of flow loss due to the return air phenomenon may be suppressed, and as rigidity of the fan base 200 is increased, an effect of suppressing deformation of the fan base 200 due to an external force may be provided.

A ring-shaped coupling guiding protrusion 205 may be installed at the rear of the base plate 201 that faces the protruding rib 203. The first coupling protrusion 134, which protrudes to the front of the filter case 80, may be moved to an inner side of the coupling guiding protrusion 205 and then be inserted into the rear of the coupling protrusion 204 and fixed by being fitted thereto. In a case in which the first coupling protrusion 134 of the filter case 80 is moved to the inner side of the coupling protrusion 204 of the fan base 200 and coupled thereto without the coupling guiding protrusion 205, an area in which the first coupling protrusion 134 comes into contact with the fan base 200 may be reduced and a coupling force may be decreased, and thus, the filter case 80 and the fan base 200 may be separated.

In order to allow compact design by suppressing an increase in length of the fan base 200 in the longitudinal direction E while addressing the above problem, the coupling guiding protrusion 205 may be additionally provided. When the first coupling protrusion 134 is coupled to the fan base 200, as the coupling guiding protrusion 205 and the inner side of the coupling protrusion 204 come in contact with the outer side surface of the first coupling protrusion 134, the area in which the first coupling protrusion 134 comes into contact with the fan base 200 is increased, and thus, the coupling force may be increased.

Figure 28:
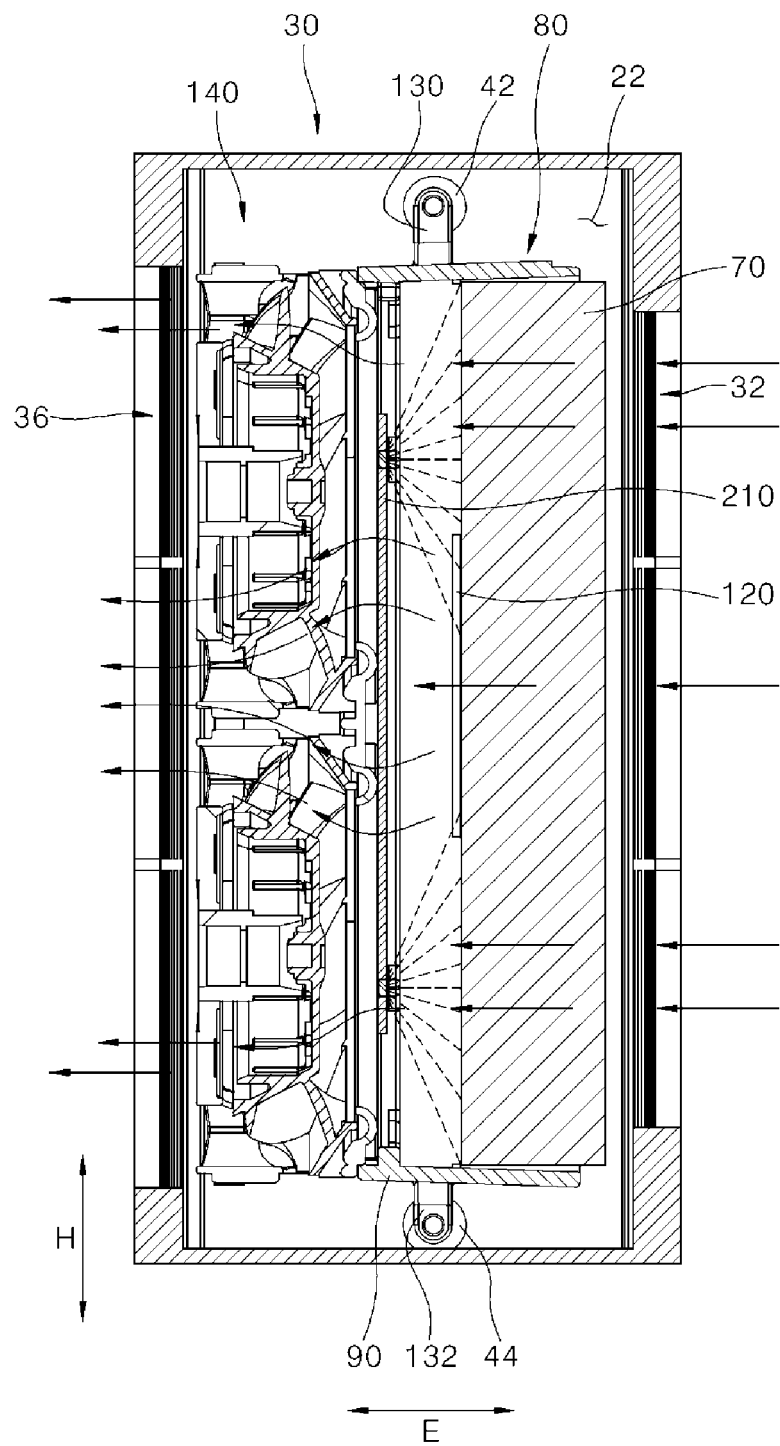
FIG. 28 is a view illustrating a state in which sanitizing light is irradiated from the sanitizing portion toward the filter according to an embodiment.

FIG. 28 is a view illustrating a state in which sanitizing light is irradiated from the sanitizing portion toward the filter according to an embodiment. As illustrated in FIG. 28, the sanitizing portion 210 may be mounted on the filter case 80 and may be modified in various ways within the technical spirit in which sanitizing portion 210 irradiates the sanitizing light toward the filter 70.

The sanitizing portion 210 according to an embodiment may be inserted into the filter frame 112, and movement of the sanitizing portion 210 may be restricted due to the sanitizing portion 210 being caught on the fixing protrusion 116. An installation position of the sanitizing portion 210 may be changed in various ways within the technical spirit for sanitizing the filter 70 to prevent contamination of air while minimizing an increase in resistance of an air flow path.

As illustrated in FIG. 15, the sanitizing portion 210 may be installed at a center of the filter case 80 in the width-wise direction W and may extend in the vertical direction. As illustrated in FIG. 16, the sanitizing portion 210 may be disposed at the center of the fan module 140 in the width-wise direction W. That is, as the front of the sanitizing portion 210 is disposed at the center of the fan module 140 in the width-wise direction W and the rear of the sanitizing portion 210 is disposed at the center of the filter case 80 in the width-wise direction W, a position of the sanitizing portion 210 is an optimal position set in consideration of an irradiation distance and irradiation angle of the sanitizing light while minimizing friction with air that moves from the filter case 80 to the fan module 140.

In this embodiment, two fans 160 are installed in the vertical direction along the sanitizing portion 210. The upper end of the sanitizing portion 210 is installed at a lower position than the upper end of the hub 170 of the fan 160 disposed at the upper side of the sanitizing portion 210. Therefore, as the sanitizing portion 210 does not interfere with an air suction flow path disposed at the upper side of the upper end of the hub 170 of the fan 160 disposed at the upper side of the sanitizing portion 210, an increase in frictional resistance of the air flow path may be minimized.

Also, the lower end of the sanitizing portion 210 is installed at a higher position than the lower end of the hub 170 of the fan 160 disposed at the lower side of the sanitizing portion 210. Therefore, as the sanitizing portion 210 does not interfere with an air suction flow path that is disposed at the lower side of the lower end of the hub 170 of the fan 160 disposed at the lower side of the sanitizing portion 210, an increase in frictional resistance of the air flow path may be minimized.

In a state in which the plurality of fans 160 are continuously installed in the vertical direction, as the upper end and lower end of the sanitizing portion 210 extending in the vertical direction do not protrude to the outside of the hub 170 of the fan 160, interference of the sanitizing portion 210 with an air flow path along which air is suctioned into the fan 160 may be minimized. Therefore, an increase in resistance of the air flow path along which air is suctioned into the fan 160 may be minimized, and air purification performance may be improved.

The sanitizing portion 210 according to an embodiment may include a printed circuit board (PCB) 211 and a sanitizing light source 212. The PCB 211 is a rectangular plate extending in the vertical direction, and the front of the PCB 211 is supported by the bell mouth 202 of the fan base 200 while the rear of the PCB 211 is supported by the fixing protrusion 116 of the filter case 80.

The sanitizing light source 212 may be an ultraviolet-C light emitting diode (UVC LED), or various other types of sanitizing apparatuses may be used as the sanitizing light source 212 within the technical spirit in which the sanitizing light source 212 sterilizes the filter 70. The sanitizing light source 212 may be installed at both sides of the PCB 211 in the vertical direction and irradiate the filter 70 with the sanitizing light.

An installation position and number of sanitizing light sources 212 may be changed in consideration of the length of the filter 70 in the vertical direction H according to embodiments. An irradiation angle of the sanitizing light irradiated by the sanitizing light source 212 may be in a range of 140° to 160°. Therefore, as rays of sanitizing light irradiated by the sanitizing light sources 212 installed at the upper side and lower side of the PCB 211 reach the filter 70 and partially overlap each other, the entire side surface located at the front of the filter 70 may be sanitized.

As illustrated in FIGS. 12 and 27, as the fan housing 150 and the fan 160 according to an embodiment, two fan housings 150 and two fans 160 may be installed in the vertical direction of the fan base 200, and a central axis of rotation of the fan 160 may intersect the sanitizing portion 210 at a right angle. A virtual line that passes through the center of rotation of the fan 160 disposed at the upper side and extends in the first direction is set as a first horizontal center line P1, and a virtual line that passes through the center of rotation of the fan 160 disposed at the lower side and extends in the first direction is set as a second horizontal center line P2. When a virtual line that intersects the first horizontal center line P1 and the second horizontal center line P2 in the vertical direction is referred to as "vertical virtual line V," the sanitizing portion 210 is installed to be parallel to the vertical virtual line V. In a case in which the sanitizing portion 210 is inclined with respect to the vertical virtual line V, as a contact area with air passing through the filter 70 and moving to the fan module 140 increases, and thus, frictional resistance generated during movement of air is increased, there is a problem in that air purification performance is degraded. However, in the case in which the sanitizing portion 210 is installed to be parallel to the vertical virtual line V, as the contact area with air passing through the filter 70 and moving to the fan module 140 may be minimized, and thus, an increase in the frictional resistance generated during movement of air may be minimized, degradation of air purification performance may be prevented.

Figure 29:
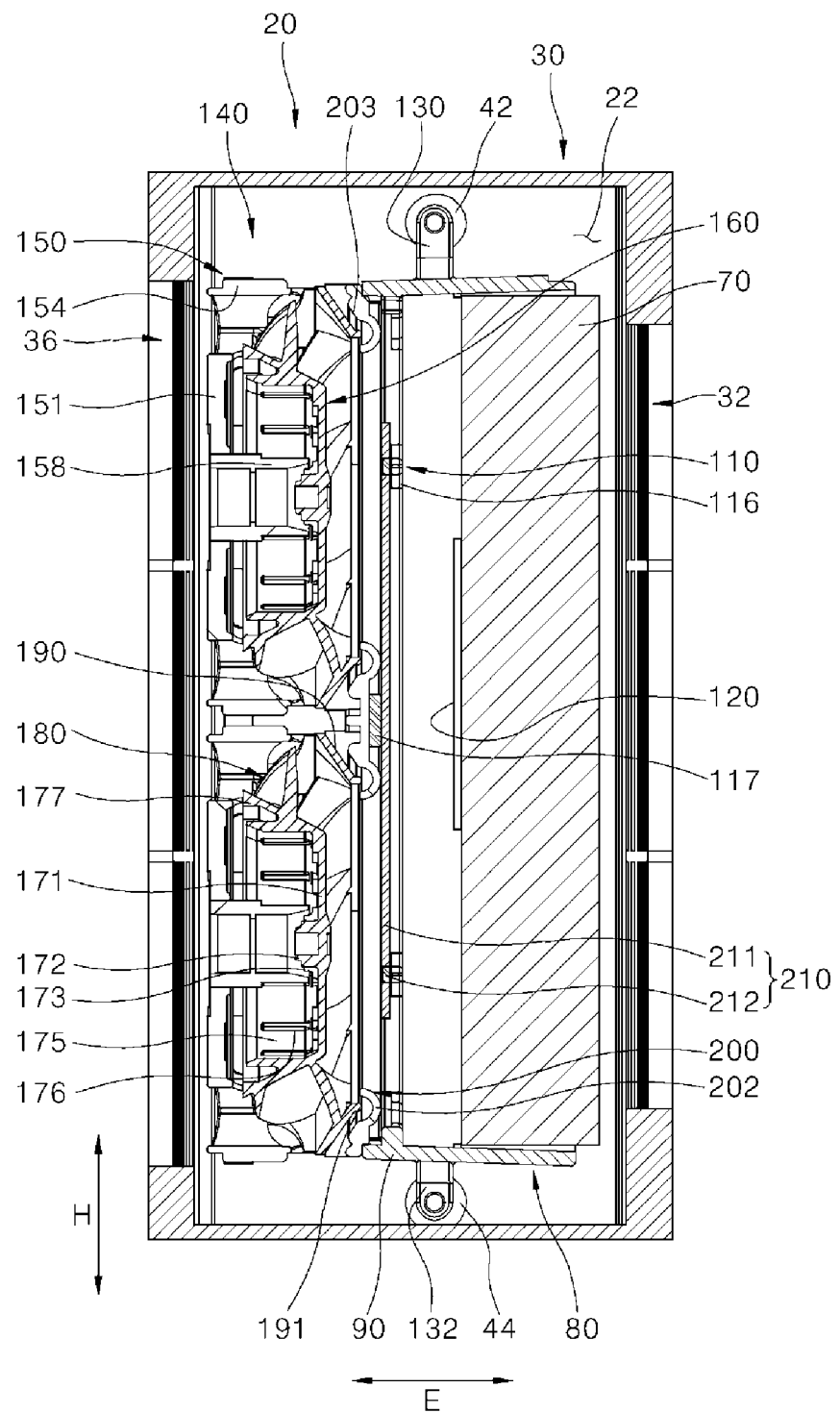
FIG. 29 is a view illustrating a state in which a locking protrusion is installed on a rear surface of the sanitizing portion according to an embodiment.

FIG. 29 is a view illustrating a state in which a locking protrusion is installed on a rear surface of the sanitizing portion according to an embodiment. As illustrated in FIG. 29, a separate locking protrusion 117 may be additionally installed at the front of the sanitizing portion 210. In a state in which the sanitizing portion 210 is inserted into the filter frame 112 disposed in the filter case 80, the fixing protrusion 116 and the locking protrusion 117 protrude from the filter frame 112.

The fixing protrusion 116 may be disposed at the rear of the sanitizing portion 210, and the locking protrusion 117 may be disposed at the front of the sanitizing portion 210. As the fixing protrusion 116 is disposed at the upper side and lower side of the sanitizing portion 210, and the locking protrusion 117 is disposed at the center of the sanitizing portion 210 and made of a plastic material such that its shape is deformable to some extent, shapes of the fixing protrusion 116 and the locking protrusion 117 may be deformed when the sanitizing portion 210 is mounted. Also, after the mounting of the sanitizing portion 210 is completed, shapes of the fixing protrusion 116 and the locking protrusion 117 may be restored to original shapes.

As illustrated in FIGS. 11 and 28, as air that enters through the inlet 32 is guided to move in the horizontal direction and is discharged to the outside of the housing 10 through the outlet 36 after sequentially passing through the filter 70, the filter case 80, and the fan module 140, a movement path of air is shortened, and thus, air purification performance may be improved. Further, as the sanitizing portion 210 is fixed in a shape of being inserted into the filter case 80, heat dissipation of the sanitizing portion 210 may be easily performed by air moving to the fan module 140 through the filter case 80, and thus, durability of the sanitizing portion 210 may be improved.

Furthermore, as an area in which air enters the housing 10 through the inlet 32 is larger than an area of the filter 70 that faces the inlet 32, a large amount of air may move to the fan module 140 through the filter 70 even during a low-speed operation of the fan module 140. Thus, air purification efficiency may be improved. Also, as the filter case 80 is installed to surround the outer side edge of the filter 70, air passing through the filter 70 does not move in the first direction toward the inlet 32 and is blocked from moving in the vertical direction H of the filter 70 through the edge of the filter 70. Thus, an ability of air to move in a straight line may be secured.

As the sanitizing portion 210 is installed at the center of the filter case 80 and the fan module 140 in the width-wise direction W, and the upper end and lower end of the sanitizing portion 210 do not protrude to the outside of the hub 170 which is installed at the upper side and lower side of the sanitizing portion 210, an increase in resistance of a flow path due to the sanitizing portion 210 may be minimized. Thus, suctioning, discharging, and filtering of air may be effectively performed while flow loss of air is minimized. Physical particles, such as dust, fine dust, and ultrafine dust, chemical substances, such as odour particles and harmful gases, and microorganisms, such as bacteria and viruses contained in air may be filtered as the air passes through the filter 70.

Also, as the center of the inlet 32 in the width-wise direction W, the center of the filter 70 in the width-wise direction W, the center of the filter case 80 in the width-wise direction W, the center of the sanitizing portion 210 in the width-wise direction W, the center of the fan module 140 in the width-wise direction W, and the center of the outlet 36 in the width-wise direction W are arranged in a straight line along the second horizontal center line P2, suctioning and filtering of air may be effectively performed while flow loss of air is minimized. Air that has passed through the filter 70, that is, purified air, may enter the fan module 140. A flow of air may be guided by the bell mouth 202, and in this way, air may be effectively guided to smoothly enter the fan module 140.

The air that enters the fan module 140 may be discharged to the front of the fan module 140. The air discharged to the front of the fan module 140 may be discharged in a diagonal flow direction. The diagonal flow direction may be defined as a forward diagonal direction.

Air suctioned into a central portion of the rear of the fan module 140 may be moved to the front through a discharge port provided in an annular shape along an inner side of an edge of the fan module 140 and moved to the front through a space formed between supports of a rotational supporter. That is, as a diagonal flow fan is applied to the fan module 140, the air that enters through the rear of the fan module 140 may be discharged in a direction inclined forward, and an air movement path of the rotational supporter may coincide with a flow path direction. Thus, flow loss of air may be reduced.

Also, the air discharged to the front of the fan module 140 may be moved along a curved surface at an inner side of the first case 20, which is disposed between both side corners of the fan module 140 in the width-wise direction W and both side corners of the inlet 32 in the width-wise direction W, guided to move in a straight line in the first direction, and discharged to the front of the housing 10 through the discharge. As the inner side of the first case 20 is formed in a curved shape, and the inner side of the first case 20 that comes into contact with the fan module 140 has an inner diameter in the width-wise direction W that gradually decreases toward the inlet 32, the inner side of the first case 20 serves as an air guide that allows air that exits the fan module 140 to move toward the inlet 32. As the inner side of the first case 20 forms a concave curved surface, friction due to coming in contact with air moving from the fan module 140 toward the inlet 32 is minimized such that air flow performance is improved, and an ability of air to move forward in a straight line may be maintained.

As the inlet grilles 33 disposed at the inlet 32 and the outlet grilles 37 disposed at the outlet 36 extend in the first direction, air passing through portions between the inlet grilles 33 and air being discharged through the outlet grilles 37 may be moved in a straight line in the first direction. Thus, a movement path of air passing through the housing 10 is shortened, and an air blowing ability is improved.

As illustrated in FIG. 11, the first horizontal center line passing through the center of the housing 10 in the transverse direction is located at the center of the inlet 32 and the outlet 36. The first horizontal center line is a virtual line that passes through a portion with the largest diameter of the transverse cross-section of the first case 20. Also, the second horizontal center line is perpendicular to the first horizontal center line and extends in the first direction.

The portable air purifier 1 is formed in a substantially cylindrical shape and extends in the vertical direction. For the portable air purifier 1 to be mounted in a cup holder of a vehicle, components for air purifying, sanitizing, and disinfecting are installed in the portable air purifier 1 within a predetermined size. Therefore, the arrangement of the components is one important technical advantage.

As the arrangement of the fan module 140 and the filter 70 is an important factor in the portable air purifier 1, with respect to the first horizontal center line, the filter 70 is disposed at the inlet 32 while the fan module 140 is disposed at the outlet 36. Therefore, as air, from which foreign substances are removed due to the air passing through the filter 70, passes through the fan module 140, an occurrence of a phenomenon in which foreign substances, such as dust are stuck in the fan module 140 is reduced, and the time and cost for maintenance and repair may be reduced.

Also, the sanitizing portion 210 for disinfecting the filter 70 using sanitizing light should be spaced a predetermined distance apart from the filter 70 due to an irradiation angle of the sanitizing light, the number of installed sanitizing light sources 212 and positions thereof, for example. Therefore, the sanitizing portion 210 is disposed in a direction toward the fan module 140 with respect to the first horizontal center line. As an air blowing function is significantly degraded when the installation space of the fan module 140 is reduced, it is difficult to reduce the installation space of the fan module 140, but the installation space may be reduced when a high functional filter is used as the filter 70.

Therefore, when a distance between the first horizontal center line P1 and the filter 70 is D1 and a distance between the first horizontal center line P1 and the fan module 140 is D2, D1 and D2 have different values. Also, D1 may have a greater value than D2.

For example, when D1 and D2 are equal or D2 is greater than D1, the installation space of the fan module 140 is reduced as compared to when D1 is greater than D2, and the air blowing function is significantly degraded. Thus, there is a problem in that air purification efficiency is also degraded.

On the other hand, in the case in which D1 has a greater value than D2, as the installation space of the fan module 140 may be secured, degradation of the air blowing function is prevented, and thus, there is an effect of preventing the degradation of air purification efficiency while allowing an operation of sanitizing the filter 70 to be performed. That is, as the air blowing ability of the fan module 140 is an important factor in an air purification function, the fan module 140 is installed to be closer to the first horizontal center line P1 than the filter 70. Thus, the volume of the fan module 140 may be larger than the volume of the filter 70.

The second horizontal center line that intersects the first horizontal center line at a right angle at the center of the housing 10 and extends in the transverse direction may pass through the center of the inlet 32, the filter 70, the sanitizing portion 210, the fan module 140, and the outlet 36 in the width-wise direction W. Therefore, linearity of air sequentially passing through the inlet 32, the filter 70, the sanitizing portion 210, the fan module 140, and the outlet 36 may be further improved, and the air blowing function improved. Thus, the air purification efficiency may also be improved.

As the sanitizing portion 210 is fixed in a state of being inserted into the filter case 80, reduction in the length of the fan module 140 or the filter 70 in the first direction due to installing the sanitizing portion 210 may be minimized. Thus, degradation of the air blowing function may also be prevented.

Also, the rear of the sanitizing portion 210 may be supported by the fixing protrusion 116, and the front of the sanitizing portion 210 may be supported by the bell mouth 202 of the fan base 200 or supported by the bell mouth 202 and the locking protrusion 117. Therefore, a separate bracket for fixing the sanitizing portion 210 is not necessary, and a length of another component in the first direction is not reduced due to a separately provided bracket. Thus, an excellent air purification function may be provided, and due to the reduced number of components, production costs and maintenance and repair costs may also be reduced.

In a portable air purifier according to embodiments disclosed herein, as a sanitizing portion is installed between a filter and a fan module to sanitize the filter, contamination of air may be prevented. Further, as the sanitizing portion is installed between the filter and the fan module and sanitizing light irradiated toward the filter, which blocks an inlet, is prevented from leaking to the outside of a housing, a safe usage environment may be provided.

As it is possible to fix the sanitizing portion between the filter case and the fan module or fix the sanitizing portion inside of the filter case without a separate fixing bracket to fix the sanitizing portion, an increase in resistance of an air flow path may be minimized to improve air purification performance. Also, a separate fixing bracket to fix the sanitizing portion may be added. The fixing bracket to fix the sanitizing portion may be installed at a position for minimizing an increase in resistance of an air flow path to improve air purification performance.

In a state in which the sanitizing portion is disposed at a center of the fan module in a width-wise direction and extends in a vertical direction, an upper end and a lower end of the sanitizing portion do not protrude to the outside of a hub of fans. As an upper end and a lower end of the fan module do not face a suction space formed outside of the hub, an increase in resistance of an air flow path along which air is suctioned into the fan may be minimized to improve air purification performance.

Further, as air that enters an inlet of the housing moves in the horizontal direction, sequentially passes through the filter, the sanitizing portion, and the fan module, and then is discharged through an outlet of the housing, heat dissipation of the sanitizing portion is easily performed and durability of the sanitizing portion is improved. Thus, a movement path of the air may be shortened and air purification performance may be improved.

Furthermore, as the fan module is installed to be closer to a first horizontal center line than the filter, the filter may be sanitized while degradation of air purification efficiency minimized, and thus, contamination of air may be prevented. In this way, user satisfaction may be improved.

Also, as a second case is mounted on a structure such as a cup holder having the shape of a groove which is concave toward the lower side and as air may be suctioned through the inlet provided in the first case without interfering with external structure, air purification performance may be improved.

As a transverse cross-section of the housing that is installed in a concave groove, such as a cup holder of a vehicle, is formed in a circular shape or an elliptical shape, as compared to a housing whose transverse cross-section is formed in a polygonal shape, a separation distance between the housing and the cup holder may be reduced, and thus, vibration and noise may be reduced.

Embodiments disclosed herein provide a portable air purifier capable of preventing contamination of air by installing a separate sanitizing apparatus to sanitize a filter. Embodiments disclosed herein also provide a portable air purifier capable of, in a case in which a sanitizing apparatus is installed inside of the portable air purifier, minimizing an increase in resistance of an air flow path passing through the portable air purifier to achieve high air purification performance.

Embodiments disclosed herein further provide a portable air purifier capable of, in a case in which the portable air purifier is installed in a cup holder, reducing vibration and noise of the portable air purifier.

Embodiments disclosed herein further provide a portable air purifier allowing a user to conveniently hold an outer side of a case and carry the case.

Advantages are not limited to the above-mentioned advantages, and other unmentioned advantages thereof should be understood from the description and should be more clearly understood from embodiments. Also, it should be easily understood that the advantages may be realized by means shown in the claims and combinations thereof.

Embodiments disclosed herein provide a portable air purifier having a sanitizing portion installed between a filter and a fan module to sanitize the filter. More specifically, the sanitizing portion may be installed between a filter case, which supports the filter, and the fan module or the sanitizing portion may be installed inside of the filter case so that the filter is sanitized by sanitizing light irradiated from the sanitizing portion. Also, as the sanitizing portion is installed between the fan module and the filter, and the sanitizing light is irradiated toward the filter which blocks an inlet, the sanitizing light which is harmful to the human body may be prevented from being exposed to the outside of a housing.

Further, as the sanitizing portion is installed in a shape extending in a vertical direction from a center of the fan module, an increase in resistance of an air flow path may be minimized. More specifically, in a state in which a plurality of fans is installed in the vertical direction, as an upper end and a lower end of the sanitizing portion extending in the vertical direction do not protrude to the outside of a hub of the fans, interference of the sanitizing portion with an air flow path along which air is suctioned into the fans may be minimized.

Furthermore, in a state in which an air flow path passing through the housing in a horizontal direction is formed, the sanitizing portion may be installed between the filter and the fan module. More specifically, as air entering the inlet of the housing sequentially passes through the filter, the sanitizing, and the fan module while moving in the horizontal direction and then is discharged through an outlet of the housing, a movement path of the air is short, and thus, resistance of an air flow path may be reduced.

With respect to a first horizontal center line that passes through the center of the housing in the horizontal direction and is located at the center of the inlet and the outlet, a distance between the filter and the fan module may vary. More specifically, for the sanitizing portion to irradiate the sanitizing light toward the filter, the sanitizing portion and the filter should be spaced apart from each other at a predetermined gap, and as an air blowing ability of the fan module is an important factor in an air purification function, the fan module may be installed to be closer to the first horizontal center line than the filter. Also, a volume of the fan module may be larger than a volume of the filter.

Also, a transverse cross-section of the housing that is installed in a concave groove, such as a cup holder of a vehicle, may be formed in a circular shape or an elliptical shape. More specifically, as the transverse cross-section of the housing is formed in the circular or elliptical shape, the housing may be stably seated on or in the groove of the cup holder having a circular transverse cross-section, and a separation distance between the housing and the cup holder may be reduced such that vibration and noise may be reduced.

The sanitizing portion may be fixed between the fan module and the filter case. More specifically, as a front surface of the sanitizing portion is supported by a fixing protrusion provided on the filter case, and a rear surface of the sanitizing portion is supported by the fan module, additionally installing a separate fixing bracket to fix the sanitizing portion is not necessary, and thus, an increase in resistance of an air flow path may be minimized.

A protruding rib may be provided on an outer side of a bell mouth in a radial direction, and the protruding rib may be spaced apart from a shroud at a predetermined gap and have an inclined surface that is parallel to an inclined surface of the shroud. Thus, an occurrence of flow loss due to return air may be suppressed, and as rigidity of a fan base is increased, deformation of the fan base due to an external force may be suppressed.

The portable air purifier according to embodiments disclosed herein may include the housing, the filter, the fan module, the filter case, and the sanitizing portion. The housing may have an accommodation space formed therein and may include the inlet configured to suction air and the outlet configured to discharge air. The housing may include a first case and a second case.

The filter, the sanitizing portion, and the fan module may be installed inside of the first case. Also, the inlet may be provided at one or a first side surface of the first case, and the outlet may be provided at the other or a second side surface of the first case that faces the inlet.

The first case may include a first case body and a service door. The first case body may include the inlet and the outlet and have a service space provided at a side surface.

The service door may be detachably installed at the first case body so as to open and close the service space. The service door may include a door body, a gap maintaining protrusion, and a first mounting groove. Also, the door body may be detachably installed at the first case body. The gap maintaining protrusion may protrude to the inside of the door body and may extend toward at least one of the filter or the filter case.

The first mounting groove may be a groove formed inside of the door body in the vertical direction. The first case body may further include a second mounting groove at an inner side of the first case body, which faces the first mounting groove, in the vertical direction. Also, one or a first side and the other or a second side of the fan module in a width-wise direction may be inserted into the first mounting groove and the second mounting groove to restrict movement of the fan module.

The inlet may include a plurality of inlet grilles that extends in the vertical direction installed at one or a first side surface of the housing so as to form inlet holes. The inlet grilles may extend in a longitudinal direction and guide the movement path of air in the longitudinal direction. The outlet may include a plurality of outlet grilles that extends in the vertical direction installed at the other or a second side surface of the housing so as to form outlet holes. The outlet grilles may extend in the longitudinal direction and guide the movement path of air in the longitudinal direction. The inlet holes and the outlet holes may face each other in the horizontal direction. Also, a length of the inlet in the width-wise direction may be shorter than a length of the filter in the width-wise direction.

The second case may be connected to a lower portion of the first case. A battery may be embedded in the second case.

An air flow path may be formed inside of the first case, and an air flow path may not be formed inside of the second case. A transverse cross-section of at least one of the first case or the second case may be formed in a circular shape or an elliptical shape. The first case and the second case may be separately formed and then assembled together or may be integrally formed.

The filter may be installed inside of the housing facing the inlet. The filter may be disposed inside of the housing and installed in a shape that faces the inlet. The filter may be installed in a state in which both sides thereof in the width-wise direction contact the inside of the housing. Also, the filter may have a rectangular parallelepiped shape extending in the vertical direction. The filter may be mounted inside of the filter case such that movement thereof is restricted.

The filter may be detachably installed in the filter case, and the filter case may be disposed between the filter and the fan module. The filter case may guide movement of air from the filter to the fan module.

The filter case may include at least one of a case main body, a flow path guide, a fixing support, a catching step, a first fixing protrusion, a second fixing protrusion, or a first coupling protrusion. The case main body may be fixed to the inside of the housing, and the filter may be mounted inside of the case main body. Also, both longitudinal sides of the case main body may be open.

The flow path guide may be installed at one side of the case main body and may form a path along which air moves from the filter toward the fan module. The fixing support may be disposed at a center of the flow path guide. Also, the fixing support may extend in the vertical direction and may include a protrusion configured to support the sanitizing portion.

The catching step may protrude to the inside of the case main body and restrict movement of the filter. The filter caught on the catching step may be spaced a predetermined distance apart from the sanitizing portion.

The first fixing protrusion may protrude to the upper side of the case main body and be fixed to a first boss disposed at an inner side of the housing. The second fixing protrusion may protrude to the lower side of the case main body and be fixed to a second boss disposed at an inner side of the housing. The first coupling protrusion may protrude in a direction toward the fan module and be inserted into the fan module.

Also, the flow path guide may be installed at both sides of the fixing support, extend in the vertical direction, and include a plurality of through-holes. The fixing support may include a filter frame, which is configured to form an inner hole that extends in the vertical direction and connected to the flow path guide, and a plurality of fixing protrusions that protrudes from the filter frame toward the inner hole.

The sanitizing portion may be mounted on the filter case and irradiate sanitizing light toward the filter. The sanitizing portion may be inserted into the filter frame, and movement of the sanitizing portion may be restricted due to the sanitizing portion being caught on the fixing protrusion. The sanitizing portion may be installed at a center of the filter case in the width-wise direction and may extend in the vertical direction. Also, the sanitizing portion may include a printed circuit board (PCB) which extends in the vertical direction and a sanitizing light source which is installed at both sides of the PCB in the vertical direction and is configured to irradiate the sanitizing light toward the filter. The sanitizing portion may be disposed at the center of the fan module in the width-wise direction. Also, two fans may be installed in the vertical direction along the sanitizing portion. An upper end of the sanitizing portion may be installed at a position lower than a position of an upper end of a hub of the fan disposed at the upper side of the sanitizing portion. A lower end of the sanitizing portion may be installed at a position higher than a position of a lower end of the hub of the fan disposed at the lower side of the sanitizing portion. An irradiation angle of the sanitizing light irradiated by the sanitizing light source may be in a range of 140° to 160°.

The fan module may be installed inside of the housing facing the outlet. Also, the fan module may include a fan housing, the fan, and the fan base. The fan housing may be fixed to an inner side of the housing. The fan may be rotatably installed inside of the fan housing and may move air in a direction toward the outlet. Also, the fan base may be coupled to the fan housing and may guide the air, which has passed through the filter, to enter the fan. A length of the fan module in the width-wise direction may be formed to be longer than a length of a discharge in the width-wise direction.

The fan housing may be coupled to the fan base while surrounding the fan. The fan housing, the fan, and the fan base may form a module. Also, as the fan housing and the fan, two fan housings and two fans may be installed in the vertical direction of the fan base. Also, a central axis of rotation of the fans may intersect the sanitizing portion at a right angle.

The fan housing may include at least one of a support plate, a connection support, a side support, or a protruding boss. The support plate may be in the shape of a plate installed at a position facing the fan. The connection support may extend toward the outside of the support plate. The side support may be connected to the connection support and may form a circular or quadrilateral frame around a periphery of the support plate. The protruding boss may protrude in a direction from the side support toward the fan base and may be coupled to the fan base.

The fan housing may include a wire guide which is installed on the connection support and configured to support a wire installed along a side surface of the connection support. The fan housing may include a wire fixing protrusion that protrudes from the side support and is disposed in a lateral direction of the wire, which is disposed at the outer side of the connection support, to prevent detachment of the wire.

The fan may include a hub disposed at a center of the fan housing and configured to receive external power and rotate. The fan may include a plurality of fan blades spaced apart from each other at equal intervals along an outer peripheral surface of the hub. The fan may include a shroud connected to an end portion of the plurality of fan blades, installed in an annular shape, and spaced apart from the fan base. An outer diameter of the hub and an inner diameter of the shroud may gradually decrease in a direction from the outlet toward the inlet.

The fan base may include at least one of a base plate, a bell mouth, a coupling protrusion, or a protruding rib. The base plate may be formed in the shape of a plate that includes a hole for air movement and extends in the vertical direction. The bell mouth may be installed in an annular shape at an inner side of the base plate that faces the hole. The bell mouth may include a longitudinal end surface that has a concave shape surrounding a lower side of an inlet protrusion of the shroud. The coupling protrusion may protrude from the base plate and be coupled to the protruding boss of the fan housing. Also, the protruding rib may be installed in an annular shape surrounding an outer periphery of the bell mouth. The protruding rib may be installed to be parallel to the outer side of the fan.

Air that enters through the inlet may be guided in the horizontal direction so that the air sequentially passes through the filter, the filter case, and the fan module and then is discharged to the outside of the housing through the outlet. A first horizontal center line passing through a center of the housing in the transverse direction may be disposed at a center of the inlet and the outlet. Also, when a distance between the first horizontal center line and the filter is $D1$ and a distance between the first horizontal center line and the fan module is $D2$, $D1$ and $D2$ may have different values. Also, $D1$ may have a greater value than $D2$.

A second horizontal center line that intersects the first horizontal center line at a right angle at the center of the housing and extends in the transverse direction may pass through the center of the inlet, the filter, the sanitizing portion, the fan module, and the outlet in the width-wise direction.

The fan module may include a plurality of fans installed in the vertical direction. The sanitizing portion may be installed at a position parallel to a vertical virtual line that perpendicularly intersects a central axis of rotation of the fans and extends in the vertical direction. One or a first side surface of the sanitizing portion may be supported by the fixing protrusion of the filter case. Also, the other or a second side surface of the sanitizing portion may be supported by the fan module.

Embodiments have been described above with reference to the accompanying drawings, but the embodiments are not limited by the embodiments disclosed and the drawings, and it is apparent that various modifications may be made by those of ordinary skill in the art to which the embodiments pertain. Further, even when the effects according to configurations are not explicitly described while describing the embodiments, predictable effects of the corresponding configurations should also be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable air purifier, comprising:
    a housing a transverse cross-section of which is circular or elliptical shape, which has an accommodation space formed therein, and including an inlet through which air is suctioned and an outlet through which air is discharged;
    a filter installed at an inside of the housing that faces the inlet;
    a fan module installed at the inside of the housing that faces the outlet;
    a filter case in which the filter is detachably installed and which is disposed between the filter and the fan module and configured to guide movement of air from the filter to the fan module; and
    a sanitizing portion which is mounted on the filter case and configured to irradiate sanitizing light toward the filter, wherein the air that enters through the inlet is guided in a horizontal direction so that the air sequentially passes through the filter, the filter case, and the fan module and then is discharged outside of the housing through the outlet, and wherein the portable air purifier is configured to be mounted in a cup holder of a vehicle or an outer circumferential surface of the housing of the portable air purifier is configured to be gripped by a user's hand,
    wherein the housing includes:
        a first case in which the filter, the sanitizing portion, and the fan module are installed, the inlet being disposed at a first side surface, and the outlet being disposed at a second side surface facing the inlet; and
        a second case connected to a lower portion of the first case.

2. The portable air purifier of claim 1, wherein an air flow path is formed inside of the first case, and an air flow path is not formed inside of the second case.

3. The portable air purifier of claim 1, wherein the first case includes:
    a first case body which includes the inlet and the outlet and has a service space provided at a side surface; and a service door which is detachably coupled to the first case body to open and close the service space.

4. The portable air purifier of claim 3, wherein the service door includes:
- a door body detachably coupled to the first case body;
- a gap maintaining protrusion that protrudes to an inside of the door body and extends toward at least one of the filter or the filter case; and
- a first mounting groove formed at the inside of the door body and extending in a vertical direction.

5. The portable air purifier of claim 4, wherein the first case body further includes a second mounting groove formed at an inner side of the first case body, which faces the first mounting groove, and extends in the vertical direction, and wherein first and second sides of the fan module in a width-wise direction are inserted into the first mounting groove and the second mounting groove to restrict movement of the fan module.

6. The portable air purifier of claim 1, wherein the inlet includes a plurality of inlet grilles that extends in a vertical direction installed at a first side surface of the housing to form inlet holes, wherein the outlet includes a plurality of outlet grilles that extends in the vertical direction installed at a second side surface of the housing to form outlet holes, and wherein the inlet holes and outlet holes face each other in the horizontal direction.

7. The portable air purifier of claim 1, wherein the filter is disposed at the inside of the housing facing the inlet, and both sides of the filter in a width-wise direction contact an inner surface of the housing.

8. The portable air purifier of claim 7, wherein the filter has a rectangular parallelepiped shape extending in a vertical direction and is mounted inside of the filter case such that movement of the filter is restricted.

9. The portable air purifier of claim 1, wherein the filter case includes:
- a case main body which is fixed to the inside of the housing and in which the filter is mounted, both longitudinal sides of which are open;
- a flow path guide installed at one side of the case main body and forming a path along which air moves from the filter toward the fan module; and
- a fixing support which is disposed at a center of the flow path guide, extends in a vertical direction, and includes a protrusion configured to support the sanitizing portion.

10. The portable air purifier of claim 9, wherein the filter case further includes a catching step that protrudes to the inside of the case main body and restricts movement of the filter, and wherein the filter caught on the catching step is installed to be spaced a predetermined distance apart from the sanitizing portion.

11. The portable air purifier of claim 9, wherein the filter case further includes:
- a first fixing protrusion that protrudes to an upper side of the case main body and is fixed to a first boss disposed at an inner surface of the housing; and
- a second fixing protrusion that protrudes to a lower side of the case main body and is fixed to a second boss disposed at the inner surface of the housing.

12. The portable air purifier of claim 9, wherein the filter case further includes a first coupling protrusion that protrudes in a direction toward the fan module and is inserted into the fan module.

13. The portable air purifier of claim 9, wherein the flow path guide is provided at both sides of the fixing support, extends in the vertical direction, and includes a plurality of through-holes.

14. The portable air purifier of claim 9, wherein the fixing support includes:
- a filter frame that forms an inner hole that extends in the vertical direction and is connected to the flow path guide; and
- a plurality of fixing protrusions that protrudes from the filter frame toward the inner hole, wherein the sanitizing portion is inserted into the filter frame, and movement of the sanitizing portion is restricted due to the sanitizing portion being caught on the plurality of fixing protrusions.

15. The portable air purifier of claim 1, wherein the sanitizing portion is installed at a center of the filter case in a width-wise direction and extends in a vertical direction.

16. The portable air purifier of claim 15, wherein the sanitizing portion includes:
- a printed circuit board (PCB) that extends in the vertical direction; and
- sanitizing light sources which are installed at both sides of the PCB in the vertical direction and are configured to irradiate sanitizing light toward the filter.

17. The portable air purifier of claim 15, wherein the sanitizing portion is disposed at a center of the fan module in the width-wise direction, and two fans are installed in the vertical direction along the sanitizing portion, wherein an upper end of the sanitizing portion is installed at a position lower than a position of an upper end of a hub of the fan disposed at an upper end of the sanitizing portion, and wherein a lower end of the sanitizing portion is installed at a position higher than a position of a lower end of a hub of the fan disposed at a lower end of the sanitizing portion.

18. The portable air purifier of claim 1, wherein the fan module includes:
- at least one fan housing which is fixed to the inside of the housing;
- at least one fan which is rotatably installed inside of the at least one fan housing and configured to move air in a direction toward the outlet; and
- a fan base which is coupled to the at least one fan housing and configured to guide air, which has passed through the filter, to enter the at least one fan.

19. The portable air purifier of claim 18, wherein the at least one fan housing and the at least one fan comprise two fan housings and two fans installed in a vertical direction of the fan base, and a central axis of rotation of the two fans intersects the sanitizing portion at a right angle.

20. The portable air purifier of claim 18, wherein each of the at least one fan housing includes:
- a support plate installed at a position facing the fan;
- a connection support that extends radially outward from the support plate;
- a side support connected to the connection support and forming a circular or quadrilateral frame around a periphery of the support plate; and
- a protruding boss that protrudes in a direction from the side support toward the fan base and is coupled to the fan base.

21. The portable air purifier of claim 18, wherein each of the at least one fan includes:
- a hub disposed at a center of the fan housing and configured to receive external power and rotate;

a plurality of fan blades spaced apart from each other at equal intervals along an outer peripheral surface of the hub; and a shroud connected to an end of the plurality of fan blades, having an annular shape, and spaced apart from the fan base.

22. The portable air purifier of claim 21, wherein the fan base includes:
   a base plate that includes a hole for movement of air therethrough and extends in the vertical direction;
   a bell mouth in an annular shape installed at an inner side of the base plate that faces the hole and which includes a longitudinal end surface having a concave shape surrounding a lower side of an inlet protrusion of the shroud; and
   a coupling protrusion that protrudes from the base plate and is coupled to the protruding boss of the fan housing.

23. A portable air purifier, comprising:
   a housing a transverse cross-section of which is circular or elliptical shape, having an accommodation space formed therein, and including an inlet through which air is suctioned and an outlet through which air is discharged;
   a filter installed at an inside of the housing that faces the inlet;
   a fan module installed at the inside of the housing that faces the outlet;
   a filter case in which the filter is detachably installed and which is disposed between the filter and the fan module and configured to guide movement of air from the filter to the fan module; and
   a sanitizing portion which is mounted on the filter case and configured to irradiate sanitizing light toward the filter, wherein a first horizontally extending center line passing through a center of the housing in a transverse direction is disposed at a center of each of the inlet and the outlet, and when a distance between the first horizontally extending center line and the filter is D1 and a distance between the first horizontally extending center line and the fan module is D2, D1 has a greater value than D2, and wherein the portable air purifier is configured to be mounted in a cup holder of a vehicle or an outer circumferential surface of the housing of the portable air purifier is configured to be gripped by a user's hand.

24. The portable air purifier of claim 23, wherein the center of the inlet in a width-wise direction, a center of the filter in the width-wise direction, a center of the sanitizing portion in the width-wise direction, a center of the fan module in the width-wise direction, and the center of the outlet in the width-wise direction coincide with each other.

25. The portable air purifier of claim 23, wherein a second horizontally extending center line that intersects the first horizontally extending center line at a right angle at the center of the housing and extends in the transverse direction passes through the center of the inlet, the filter, the sanitizing portion, the fan module, and the outlet in the width-wise direction.

26. The portable air purifier of claim 23, wherein the fan module includes a plurality of fans installed in a vertical direction, and wherein the sanitizing portion is installed at a position extending lengthwise parallel to a vertical virtual line that perpendicularly intersects a central axis of rotation of the plurality of fans and extends in the vertical direction.

27. The portable air purifier of claim 23, wherein a first side surface of the sanitizing portion is supported by a fixing protrusion of the filter case and a second side surface of the sanitizing portion is supported by the fan module.

28. A portable air purifier, comprising:
   a housing a transverse cross-section of which is circular or elliptical shape and having an accommodation space formed therein, the housing comprising a first case through which an airflow passes and a second case disposed below the first case through which the airflow does not pass, the first case including an inlet through which air is suctioned and an outlet through which air is discharged;
   a filter installed at an inside of the first case facing the inlet;
   a fan module installed at the inside of the first case facing the inlet the outlet;
   a filter case in which the filter is detachably installed and which is disposed between the filter and the fan module and configured to guide movement of the air from the filter to the fan module; and
   a sanitizing portion which is mounted on the filter case and configured to irradiate sanitizing light toward the filter, wherein the air that enters through the inlet is guided in a horizontal direction so that the air sequentially passes through the filter, the filter case, and the fan module and then is discharged outside of the first case through the outlet, and wherein the portable air purifier is configured to be mounted in a cup holder of a vehicle or an outer circumferential surface of the housing of the portable air purifier is configured to be gripped by a user's hand,
   wherein the filter case includes:
      a case main body which is fixed to the inside of the housing and in which the filter is mounted, both longitudinal sides of which are open;
      a flow path guide installed at one side of the case main body and forming a path along which air moves from the filter toward the fan module; and
      a fixing support which is disposed at a center of the flow path guide, extends in a vertical direction, and includes a protrusion configured to support the sanitizing portion.

29. The portable air purifier of claim 1, wherein the second case forms a lower portion of the accommodation space and is configured to receive a battery installed therein, such that the battery is installed below the filter, the fan module, the filter case, and the sanitizing portion.

30. The portable air purifier of claim 29, wherein the battery has a heavier weight than a sum of weights of the filter, the fan module, the filter case, and the sanitizing portion.

31. The portable air purifier of claim 3, wherein the service door is detachably coupled to the side surface of the first case body at a lateral side thereof to provide access to the accommodation space from a lateral side of the portable air purifier.

* * * * *